(12) United States Patent
Tomita et al.

(10) Patent No.: US 9,458,602 B2
(45) Date of Patent: Oct. 4, 2016

(54) DUAL-ARM WORK MACHINE

(71) Applicant: Hitachi Construction Machinery Co., Ltd., Bunkyo-ku, Tokyo (JP)

(72) Inventors: Kunitsugu Tomita, Kashiwa (JP); Akinori Ishii, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 61 days.

(21) Appl. No.: 14/378,824

(22) PCT Filed: Feb. 14, 2013

(86) PCT No.: PCT/JP2013/053569
§ 371 (c)(1),
(2) Date: Aug. 14, 2014

(87) PCT Pub. No.: WO2013/122166
PCT Pub. Date: Aug. 22, 2013

(65) Prior Publication Data
US 2015/0032338 A1    Jan. 29, 2015

(30) Foreign Application Priority Data
Feb. 15, 2012    (JP) .................................. 2012-030899

(51) Int. Cl.
*E02F 3/96*    (2006.01)
*B25J 9/16*    (2006.01)
(Continued)

(52) U.S. Cl.
CPC .............. *E02F 3/964* (2013.01); *B25J 9/1682* (2013.01); *E02F 3/96* (2013.01); *E02F 3/961* (2013.01);
(Continued)

(58) Field of Classification Search
CPC ........... E02F 3/96; E02F 3/961; E02F 3/964; B25J 9/1682
USPC ........................................................ 701/50
See application file for complete search history.

(56) References Cited

U.S. PATENT DOCUMENTS 4,310,975 A * 1/1982 Bibaut .................... E02F 3/964
                                                        37/341
8,137,047 B2 * 3/2012 Ishii ....................... B25J 9/0087
                                                        701/50
(Continued)

FOREIGN PATENT DOCUMENTS

CN    101280569 A    10/2008
CN    101605954 A    12/2009
(Continued)

OTHER PUBLICATIONS

International Search Report (PCT/ISA/210) dated May 28, 2013, with English translation (Six (6) pages).
(Continued)

*Primary Examiner* — Dale W Hilgendorf
(74) *Attorney, Agent, or Firm* — Crowell & Moring LLP

(57) ABSTRACT

A dual-arm work machine includes: a first front working machine to which a first attachment is mounted; a second working machine to which a second attachment is mounted; a first drive device that drives the first front working machine and the first attachment based on a first drive command from a first operation member; a second drive device that drives the second front working machine and the second attachment based on a second drive command from a second operation member; and a drive command output device that inputs the first and second drive commands, and generates and outputs a shared drive command that drives the first and second drive devices.

12 Claims, 23 Drawing Sheets

(51) Int. Cl.
  *E02F 9/20* (2006.01)
  *E02F 9/22* (2006.01)
(52) U.S. Cl.
  CPC ............ *E02F 3/965* (2013.01); *E02F 9/2012* (2013.01); *E02F 9/2228* (2013.01); *E02F 9/2285* (2013.01); *E02F 9/2292* (2013.01); *E02F 9/2296* (2013.01)

(56) References Cited

U.S. PATENT DOCUMENTS

| | | | |
|---|---|---|---|
| 8,204,655 B2* | 6/2012 | Tomita | E02F 3/964 701/50 |
| 2010/0183416 A1* | 7/2010 | Ishii | B25J 9/0087 701/45 |
| 2011/0033274 A1 | 2/2011 | Tomita et al. | |
| 2011/0150615 A1* | 6/2011 | Ishii | E02F 3/964 701/50 |
| 2012/0328395 A1* | 12/2012 | Jacobsen | B25J 5/005 414/1 |
| 2014/0172171 A1* | 6/2014 | Seo | B25J 9/0087 700/263 |
| 2014/0290102 A1* | 10/2014 | O'Donnell | E02F 3/964 37/403 |

FOREIGN PATENT DOCUMENTS

| | | | | |
|---|---|---|---|---|
| CN | 201792249 U | | 4/2011 | |
| EP | 1 081 292 A1 | | 3/2001 | |
| EP | 1 980 673 A2 | | 10/2008 | |
| EP | 2 022 899 A1 | | 2/2009 | |
| EP | 2402513 A1 | * | 1/2012 | ............ E02F 3/965 |
| JP | 63-29811 A | | 2/1988 | |
| JP | 63-48205 U | | 4/1988 | |
| JP | 2-271402 A | | 11/1990 | |
| JP | 8-215949 A | | 8/1996 | |
| JP | 11-181815 A | | 7/1999 | |
| JP | 2001-64990 A | | 3/2001 | |
| JP | 2001-173014 A | | 6/2001 | |
| JP | 2001173013 A | * | 6/2001 | |
| JP | 2005-171510 A | | 6/2005 | |
| JP | 2009121097 A | * | 6/2009 | |

OTHER PUBLICATIONS

Nohara, et al., "Destruction Avoidance for Dual Arm Construction Machinery Using Mechanical Impedance Adjustable Hydraulic Circuit", Transactions of the Japan Society of Mechanical Engineers, vol. 77, No. 778, The Japan Society of Mechanical Engineers, Jun. 2011, pp. 101 to 111, including partial English translation (Eleven (11) pages).
Extended European Search Report issued in counterpart European Application No. 13749773.1 dated Feb. 26, 2016 (8 pages).

* cited by examiner

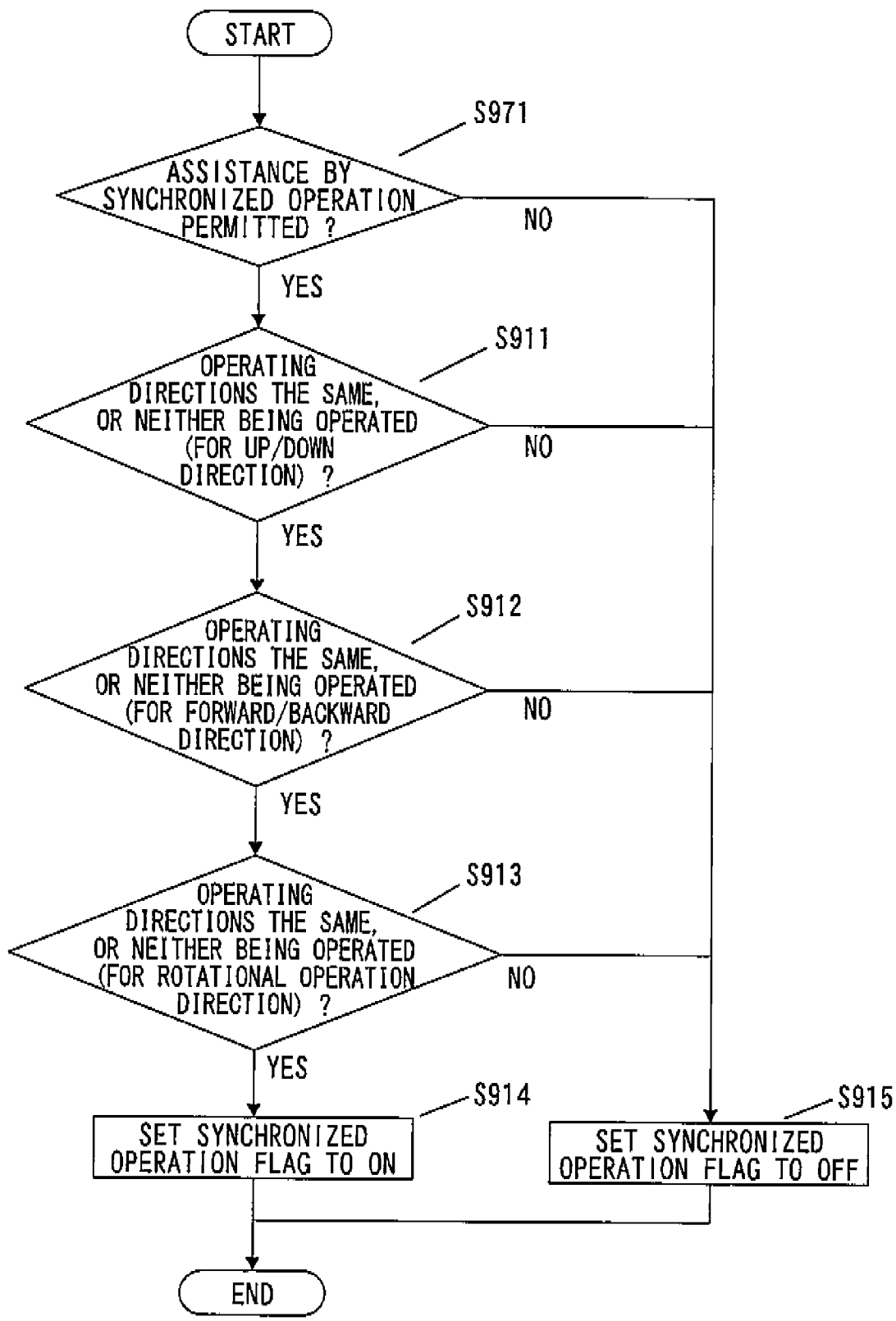

DUAL-ARM WORK MACHINE

TECHNICAL FIELD

The present invention relates to a dual-arm work machine that is equipped with working arms respectively on the right side and on the left side of the main body of the work machine.

BACKGROUND ART

A dual-arm work machine that is equipped with working arms respectively on the right side and on the left side of the main body of the work machine is per se known. Operating levers respectively corresponding to the right and left working arms are provided to such a dual-arm working machine. Since actuators that are respectively provided to the right and left working arms are driven by operating these levers, accordingly it is possible to operate the right and left working arms independently (refer to Patent Document #1).

Furthermore, a control technique for synchronizing the operation of two manipulators is per se known. In this technique, using an operating lever, the operator only performs driving operation of the manipulator on one side (the "master" side), and the operation of the two manipulators is synchronized by control being automatically performed so that the other manipulator (on the "slave" side) automatically tracks this master side manipulator. Here, the slave side is feedback controlled by referring to the joint coordinates on the master side, and by taking them as target values (refer to Patent Document #2).

CITATION LIST

Patent Literature

Patent Document #1: Japanese Laid Open Patent Publication H11-181815.
Patent Document #2: Japanese Laid Open Patent Publication H02-271402,

SUMMARY OF INVENTION

Technical Problem

With the work machine described in Patent Document #1, when a work object is grasped by grasping devices that are mounted at the end of each of the right and left working arms, if the amounts of drive of the working arms on the right and left sides are different, then the relative position of the right and left grasping devices changes, and this is undesirable because there is a fear of damage occurring to the work object that is being grasped. This is because, even in the case of an experienced operator, it is difficult to continue operation so as to keep the amounts of operation of the operating levers that operate to drive the right and left working arms equal. Furthermore, with the dual-arm robot described in Patent Document #2, while it is possible to synchronize the operation of the two manipulators, there is a response delay, since the slave side operates after the operation of the master side. Due to this, the relative positions of tools that are mounted to the left arm and to the right arm temporarily changes, and this is undesirable because there is a fear that damage will be caused to the work object that is being grasped. Moreover, since it is necessary constantly to monitor the attitudes of the manipulators, accordingly the system becomes complicated and high in cost, and this also is undesirable.

Solution to Problem

According to the 1st aspect of the present invention, a dual-arm work machine comprises: a first front working machine to which a first attachment is mounted; a second working machine to which a second attachment is mounted; a first drive device that drives the first front working machine and the first attachment based on a first drive command from a first operation member; a second drive device that drives the second front working machine and the second attachment based on a second drive command from a second operation member; and a drive command output device that inputs the first and second drive commands, and generates and outputs a shared drive command that drives the first and second drive devices.

According to the 2nd aspect of the present invention, in the dual-arm work machine according to the 1st aspect, it is preferred that: the dual-arm work machine further comprises an operation selection unit that can select either the first operation member or the second operation member; and the drive command output device generates and outputs a shared drive command to drive the first and second drive devices, based on the first drive command from the first operation member or the second drive command from the second operation member selected by the operation selection unit.

According to the 3rd aspect of the present invention, in the dual-arm work machine according to the 1st aspect, it is preferred that: the dual-arm work machine further comprises a first operating direction determination section that determines an operating direction of the first operation member, a second operating direction determination section that determines an operating direction of the second operation member, and a synchronized operation decision section that makes a decision as to whether or not the operating direction of the first operation member determined by the first operating direction determination section and the operating direction of the second operation member determined by the second operating direction determination section are the same; and if it is decided by the synchronized operation decision section that the operating direction of the first operation member and the operating direction of the second operation member are the same, the drive command output device generates and outputs the shared drive command based on the first drive command from the first operation member or the second drive command from the second operation member.

According to the 4th aspect of the present invention, in the dual-arm work machine according to the 1st aspect, it is preferred that: the dual-arm work machine further comprises a first operating direction determination section that determines an operating direction of the first operation member, a second operating direction determination section that determines an operating direction of the second operation member, a first operating amount determination section that determines an operating amount of the first operation member, a second operating amount determination section that determines an operating amount of the second operation member, and a synchronized operation decision section that makes a decision as to whether or not the operating direction of the first operation member determined by the first operating direction determination section and the operating direction of the second operation member determined by the second operating direction determination section are the same; and if it is decided by the synchronized operation decision section that the operating direction of the first operation member and the operating direction of the second operation member are the same, the drive command output device generates and outputs the shared drive command based on an average value of the operating amount of the first operation member determined by the first operating amount determination section and an operating amount of the second operation member as determined by the second operating amount determination means.

According to the 5th aspect of the present invention, in the dual-arm work machine according to the 1st aspect, it is preferred that: the dual-arm work machine further comprises a first operating vector calculation unit that calculates an operating vector of the first operation member, a second operating vector calculation unit that calculates an operating vector of the second operation member, and a synchronized operation decision section that makes a decision as to whether or not the operating vector of the first operation member calculated by the first operating vector calculation unit and the operating vector of the second operation member calculated by the second operating vector calculation unit are approximately the same; and if it is decided by the synchronized operation decision section that the operating vector of the first operation member and the operating vector of the second operation member are approximately the same, the drive command output device generates and outputs the shared drive command based on the first drive command from the first operation member and/or the second drive command from the second operation member.

According to the 6th aspect of the present invention, in the dual-arm work machine according to any one of the 1st through 5th aspects, it is preferred that the dual-arm work machine further comprises: a synchronization selection member that is operated in order for a user to select whether or not a movement of the first front working machine and the first attachment and a movement of the second front working machine and the second attachment are to be synchronized or not; and a shared drive command generation permission section that permits generation and output of the shared drive command by the drive command output device if synchronization of the movement of the first front working machine and the first attachment and the movement of the second front working machine and the second attachment is selected by the synchronization selection member, and prohibits generation and output of the shared drive command by the drive command output device if synchronization of the movement of the first front working machine and the first attachment and the movement of the second front working machine and the second attachment is not selected by the synchronization selection member.

According to the 7th aspect of the present invention, in the dual-arm work machine according to any one of the 1st through 5th aspects, it is preferred that the dual-arm work machine further comprises: a first attitude detection unit that detects an attitude of the first front working machine and the first attachment; a second attitude detection unit that detects an attitude of the second front working machine and the second attachment; an attitude determination section that determines whether or not the attitude of the first front working machine and the first attachment detected by the first attitude detection unit and the attitude of the second front working machine and the second attachment detected by the second attitude detection unit are approximately the same; and a shared drive command generation permission section that permits generation and output of the shared drive command by the drive command output device when it is decided by the attitude determination section that the attitude of the first front working machine and the first attachment and the attitude of the second front working machine and the second attachment are approximately the same, and prohibits generation and output of the shared drive command by the drive command output device when it is decided by the attitude determination section that the attitude of the first front working machine and the first attachment and the attitude of the second front working machine and the second attachment are not approximately the same.

According to the 8th aspect of the present invention, in the dual-arm work machine according to the 7th aspect, it is preferred that: the dual-arm work machine further comprises a synchronization selection member that is operated in order for the user to select whether or not the movement of the first front working machine and the first attachment and the movement of the second front working machine and the second attachment are to be synchronized or not; and the shared drive command generation permission section permits generation and output of the shared drive command by the drive command output device when it is decided by the attitude determination section that the attitude of the first front working machine and the first attachment and the attitude of the second front working machine and the second attachment are approximately the same, and synchronization of the movement of the first front working machine and the first attachment and the movement of the second front working machine and the second attachment is selected by the synchronization selection member, and prohibits generation and output of the shared drive command by the drive command output device when it is decided by the attitude determination section that the attitude of the first front working machine and the first attachment and the attitude of the second front working machine and the second attachment are not approximately the same, or synchronization of the movement of the first front working machine and the first attachment and the movement of the second front working machine and the second attachment is not selected by the synchronization selection member.

Advantageous Effects of Invention

According to the present invention, a convenient structure can be implemented for synchronizing the operation of the first front working machine and the first attachment, with the operation of the second front working machine and the second attachment, and accordingly it is possible to provide at low cost a dual-arm work machine that can be applied to a wide range of tasks.

BRIEF DESCRIPTION OF DRAWINGS

FIG. 23 is a flow chart showing the flow of processing of an operating direction determination section of the sixth embodiment.

DESCRIPTION OF EMBODIMENTS

Embodiment #1

Figure 1:
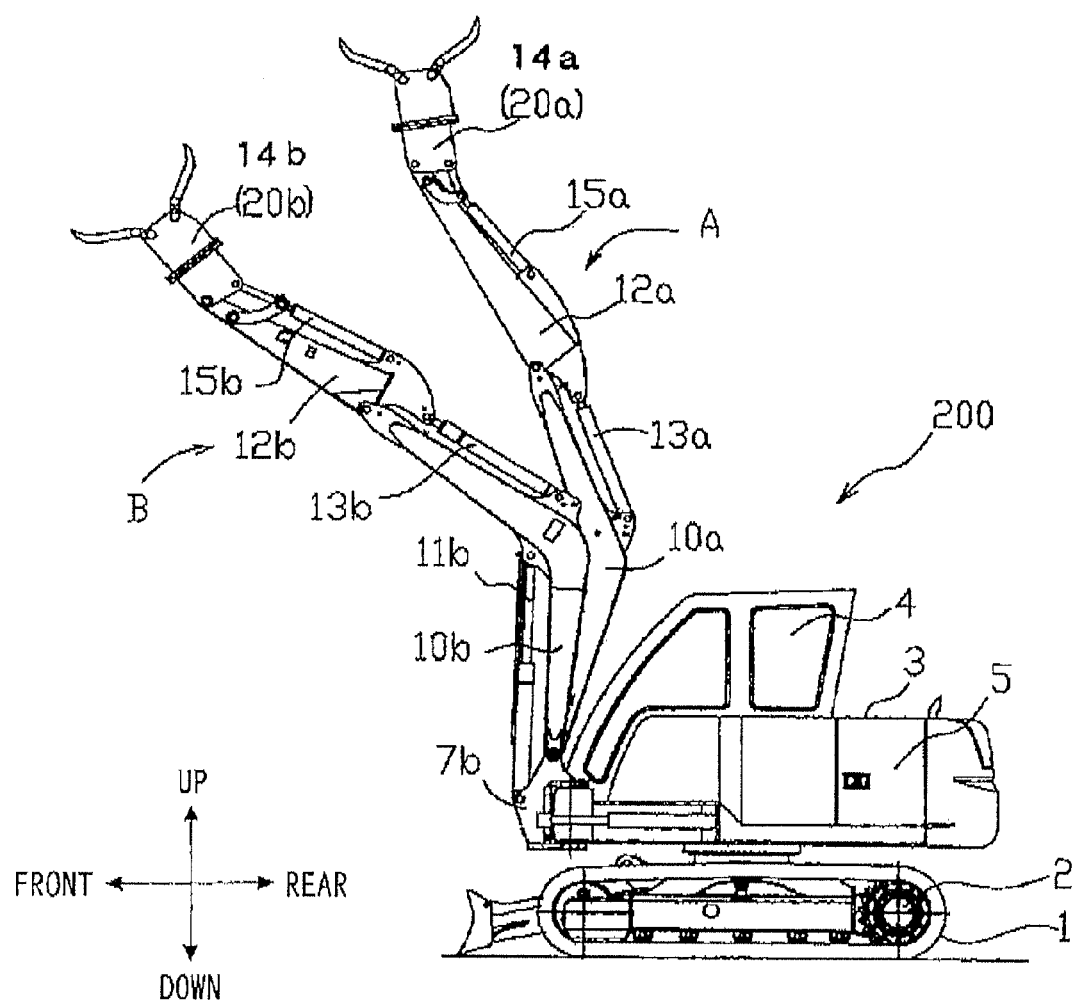
FIG. 1 is a figure showing a dual-arm work machine according to a first embodiment.
Figure 2:
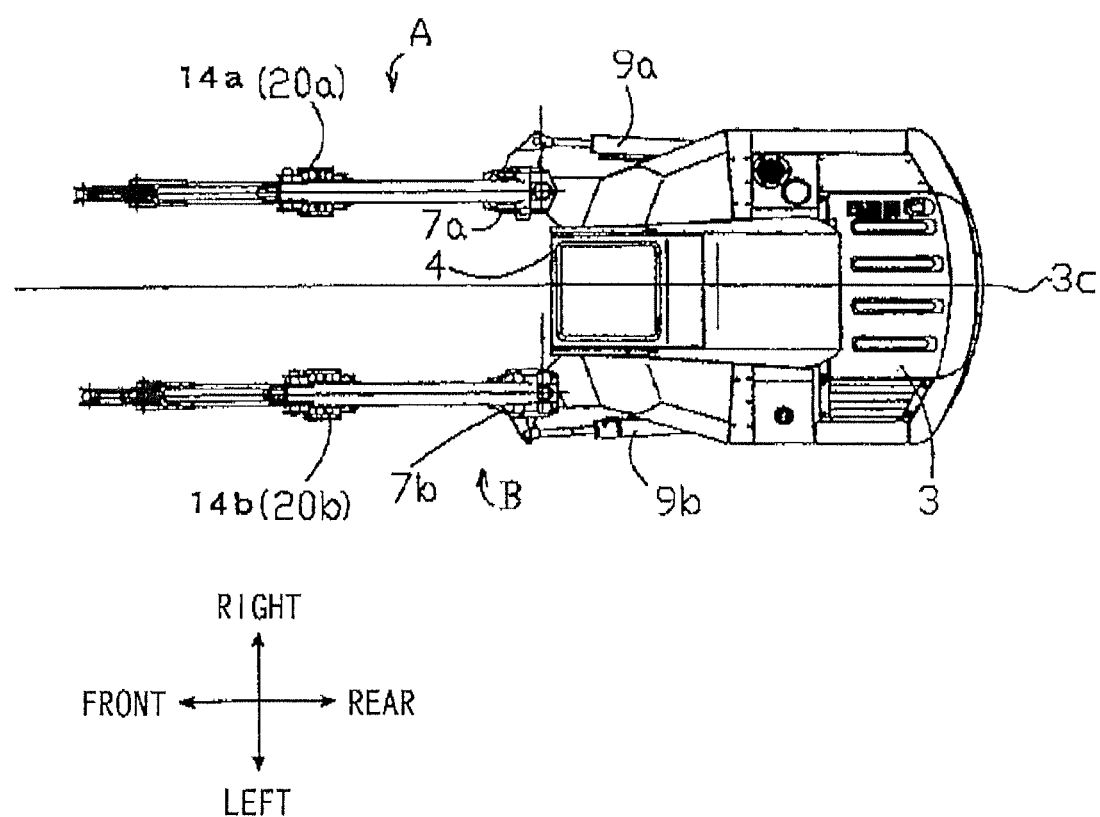
FIG. 2 is a figure showing this dual-arm work machine according to the first embodiment.

A first embodiment of the dual-arm work machine of the present invention will now be explained with reference to FIGS. 1 through 9. FIGS. 1 and 2 are figures showing the dual-arm work machine according to the first embodiment. The work machine 200 of the first embodiment is a work machine that is constructed on the basis of a hydraulic excavator. In this work machine 200, a revolving upperstructure 3 is revolvably mounted to a lower traveling body 2 having a traveling crawler 1, and an operator cab 4 is provided near the center line 3c in the transverse direction of this revolving upperstructure 3. As viewed forward from the operator cab 4, a first front working machine A and a second front working machine B are provided on the right side and on the left side of the center line 3C respectively.

—The First Front Working Machine—

The first front working machine A comprises a swing post 7a that is mounted to the revolving upperstructure 3 on its right side facing forwards so as to swing freely in the right and left directions, a boom 10a that is mounted to this swing post 7a so as to pivot freely in the up/down direction, an arm 12a that is mounted to this boom 10a so as to pivot freely in the up/down direction, and a grapple 20a that is one example of a first working tool (i.e. a first attachment) 14a which is mounted to this arm 12a so as to pivot (i.e. rotate) freely in the up/down direction. In other words, the first front working machine A comprises a freely pivoting joint that connects the revolving upperstructure 3 and the swing post 7a together, a freely pivoting joint that connects the swing post 7a and the boom 10a together, a freely pivoting joint that connects the boom 10a and the arm 12a together, and a freely rotating joint that connects the arm 12a and the grapple 20a together.

The first front working machine A also comprises a swing cylinder 9a that is linked to the swing post 7a and to the revolving upperstructure 3 and that causes the swing post 7a to swing right and left, and a boom cylinder 11a (not shown in FIGS. 1 and 2) that is linked to the swing post 7a and to the boom 10a and that makes the boom 10a pivot up and down.

Moreover, the first front working machine A also comprises an arm cylinder 13a that is linked to the boom 10a and to the arm 12a and that makes the arm 12a pivot up and down, and a working tool cylinder 15a that is linked to this arm 12a and to the grapple 20a and that makes the grapple 20a rotate up and down. Here, the grapple 20a may, as desired, be exchanged for a cutter or a bucket not shown in the figures or the like, or for some other type of working tool. It should be understood that, collectively, the boom 10a and the arm 12a are herein sometimes also termed the "right side front working arm".

—The Second Front Working Machine—

The second front working machine B is provided on the left side facing forward of the revolving upperstructure 3. The second front working machine B has a structure similar to that of the first front working machine A. Thus, the reference symbols for the members of the second front working machine B are the same as those for the corresponding members of the first front working machine A, except with "b" substituted for "a". The position of attachment of the swing post 7b and the shapes and the dimensions of the swing post 7b, the boom 10b, and the arm 12b in the second front working machine B, are the same as the position of attachment of the swing post 7a and the shapes and the dimensions of the swing post 7a, the boom 10a, and the arm 12a in the first front working machine A. Moreover, the grapple 20b is the same type of working tool (attachment) as the grapple 20a. And the characteristics of the various hydraulic cylinders that drive the various parts of the second front working machine B are also the same as the characteristics of the various corresponding hydraulic cylinders that drive the various parts of the first front working machine A. Accordingly, detailed explanation of the second front working machine B will be omitted. It should be understood that, collectively, the boom 10b and the arm 12b are herein sometimes also termed the "left side front working arm".

—The Operating Apparatus—

Figure 3:
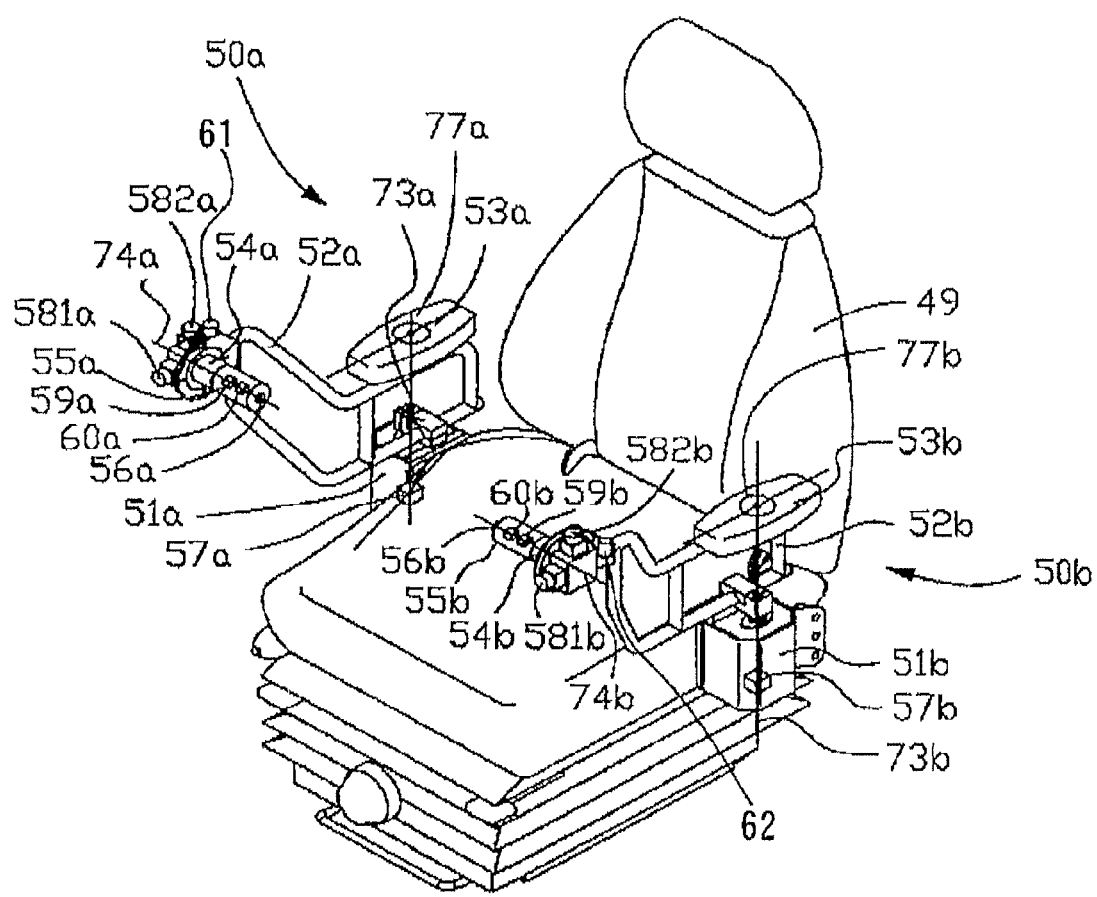
FIG. 3 is a figure showing an operating apparatus of the first embodiment.

FIG. 3 is a figure showing an operating apparatus of the first embodiment. An operator's seat 49 is installed in the operator cab 4, with an operating device 50a being provided on the right side forward of the operator's seat 49 and an operating device 50b being provided on the left side forward thereof. The operating device 50a is an operating device for the first front working machine A, while the operating device 50b is an operating device for the second front working machine B. The operating device 50a comprises: an operating arm bracket 51a that is provided on the right side of the operator's seat 49; an operating arm 52a that is mounted to this operating arm bracket 51a so as to swing freely to the right and left around a central swing axis line 73a, and that issues commands for the swing post 7a to swing right and left; an operating lever 54a that is mounted to the end portion of this operating arm 52a so as to extend horizontally and that is able to rotate freely up, down, forward, and backward, and that is used for issuing operating commands for motion of the boom 10a and the arm 12a; a working tool twist grip 55a that is mounted around the outside of this operating lever 54a so as to rotate freely about the axis of the operating lever 54a, and that is used for issuing commands for rotation of the working tool 14a; and a working tool operation switch 56a that is mounted at the end portion of the operating lever 54a, and that issues commands for the working tool 14a to start and to stop.

Furthermore, the operating device 50a comprises: an operating arm displacement detector 57a that is mounted to the operating arm bracket 51a, and that detects the amount of swing displacement of the operating arm 52a and generates a signal representative thereof; an operating lever up/down direction displacement detector 581a that is mounted to the operating arm 52a, and that detects the amount of displacement of the operating lever 54a in the up/down direction and generates a signal representative thereof; and an operating lever forward/backward direction displacement detector 582a that, in a similar manner to the above, detects the amount of displacement of the operating lever 54a in the forward/backward direction and generates a signal representative thereof. Moreover, the operating device 50a comprises: a twist grip displacement detector 59a that is provided to the operating lever 54a, and that detects the amount of rotational displacement of the working tool twist grip 55a and generates a signal representative thereof; and an operation switch displacement detector 60a that is provided to the working tool twist grip 55a, and that detects the amount of displacement of the working tool operation switch 56a and generates a signal representative thereof.

The operating device 50b is provided in a similar manner to the operating device 50a, but on the left side of the operator's seat. Thus, the reference symbols for the members of the operating device 50b are the same as those for the corresponding members of the operating device 50a, except with "b" substituted for "a", and accordingly detailed explanation thereof will be omitted.

An operating lever selection switch 61 is a switch for, when a dual-arm synchronization mode is set as will be described hereinafter, selecting whether both the first front working machine A and the second front working machine B should be operated by the right side operating device 50a, or both the first front working machine A and the second front working machine B should be operated by the left side operating device 50b. For this operating lever selection switch 61, the selection position that makes it possible to operate both the first front working machine A and also the second front working machine B with the right side operating device 50a is called the "right side operating device selection position". In a similar manner, for the operating lever selection switch 61, the selection position that makes it possible to operate both the first front working machine A and also the second front working machine B with the left side operating device 50b is called the "left side operating device selection position". The operating lever selection switch 61 may, for example, be provided near the end of the operating arm 52a.

A dual-arm synchronization mode switch 62 is a switch for selecting whether to establish the dual-arm synchronization mode, or to establish a normal mode that will be described hereinafter, and this switch may be provided, for example, near the end of the operating arm 52b. In this work machine 200 of the first embodiment, the normal mode and the dual-arm synchronization mode are provided as operational modes for the first front working machine A and the second front working machine B.

The normal mode is an operational mode for operating the first front working machine A with the right side operating device 50a, and operating the second front working machine B with the left side operating device 50b. Accordingly, if the operational mode is set to the normal mode by operation of this dual-arm synchronization mode switch 62, then the operation of the first front working machine A and the second front working machine B becomes similar to the operation of a prior art type two arm work machine. It should be understood that the details of the operation of the first front working machine A and the second front working machine B during the normal mode will be described hereinafter.

The dual-arm synchronization mode is an operational mode in which it is possible to perform operation as described in (a) and (b) below.

(a) When the right side operating device selection position is selected by the operating lever selection switch 61, it is possible to operate the right and left boom cylinders 11a and 11b, the right and left arm cylinders 13a and 13b, and the right and left working tool cylinders 15a and 15b simultaneously by using only the right side operating lever 54a and the right side working tool twist grip 55a.

(b) When the left side operating device selection position is selected by the operating lever selection switch 61, it is possible to operate the right and left boom cylinders 11a and 11b, the right and left arm cylinders 13a and 13b, and the right and left working tool cylinders 15b and 15b simultaneously by using only the left side operating lever 54b and the left side working tool twist grip 55b.

It should be understood that the details of the operation of the first front working machine A and the second front working machine B in the dual-arm synchronization mode will be described hereinafter.

—The Operating Attitude—

In order to operate the operating devices 50a and 50b and to use the first front working machine A and the second front working machine B, the operator sits in the operator's seat 49, rests his elbow joints upon elbow joint support portions 77a and 77b of arm rests 53a and 53b on the operating arms 52a and 52b, grasps the working tool twist grips 55a and 55b with his palms, and places his fingers upon the working tool operation switches 56a and 56b.

—Operation with the Operating Levers in the Normal Mode—

When the operational mode is set to the normal mode, and when the operator, who is in the operating attitude described above, displaces the right side operating lever 54a with his palm in the up/down direction (refer to the arrow sign "y" in FIG. 5), then the boom cylinder 11a of the first front working machine A extends or retracts. Moreover, when the operator displaces the left side operating lever 54b in the up/down direction, then the boom cylinder 11b of the second front working machine B extends or retracts. Due to this, the boom 10a or the boom 10b is made to pivot (refer to the arrow sign "Y" in FIG. 6). At this time, the pivoting speed of the boom 10a or of the boom 10b bears a monotonically increasing relationship to the displacement amount of the operating lever 54a or of the operating lever 54b, for example a proportional relationship, so that the displacement of the operating lever 54a or of the operating lever 54b controls the speed of pivoting of the boom 10a or 10b.

In a similar manner, when the operator displaces the right side operating lever 54a with his palm in the forward/backward direction (refer to the arrow sign "x" in FIG. 5), then the arm cylinder 13a of the first front working machine A extends or retracts. Moreover, when the operator displaces the left side operating lever 54b in the forward/backward direction, then the arm cylinder 13b of the second front working machine B extends or retracts. Due to this, the arm 12a or the arm 12b is made to pivot (refer to the arrow sign "X" in FIG. 6). At this time, the pivoting speed of the arm 12a or of the arm 12b bears a monotonically increasing relationship to the displacement amount of the operating lever 54a or of the operating lever 54b, for example a proportional relationship, so that the displacement of the operating lever 54a or of the operating lever 54b controls the speed of pivoting of the arm 12a or of the arm 12b.

—Operation with the Twist Grips in the Normal Mode—

When the operational mode is set to the normal mode, and when the operator rotates the working tool twist grip 55a on the right side around its central rotational axis line 74a with his palm (refer to the arrow sign "z" in FIG. 5), then the working tool cylinder 15a of the first front working machine A extends or retracts. Moreover, when the operator rotates the working tool twist grip 55b on the left side around its central rotational axis line 74b with his palm, then the working tool cylinder 15b of the second front working machine B extends or retracts. Due to this, the first working tool 14a or the second working tool 14b (hereinafter simply termed the "working tools" 14a and 14b) is rotated in a rotational direction that agrees with the rotational direction of the working tool twist grip 55a or of the working tool twist grip 55b (refer to the arrow sign "Z" in FIG. 6). At this time, the rotational speed of the working tool 14a or of the working tool 14b bears a monotonically increasing relationship to the rotational displacement amount of the twist grip 55a or of the twist grip 55b, for example a proportional relationship, so that the displacement of the twist grip 55a or of the twist grip 55b controls the speed of rotating of the working tool 14a or of the working tool 14b.

—Control with the Operation Switches—

Figure 4:
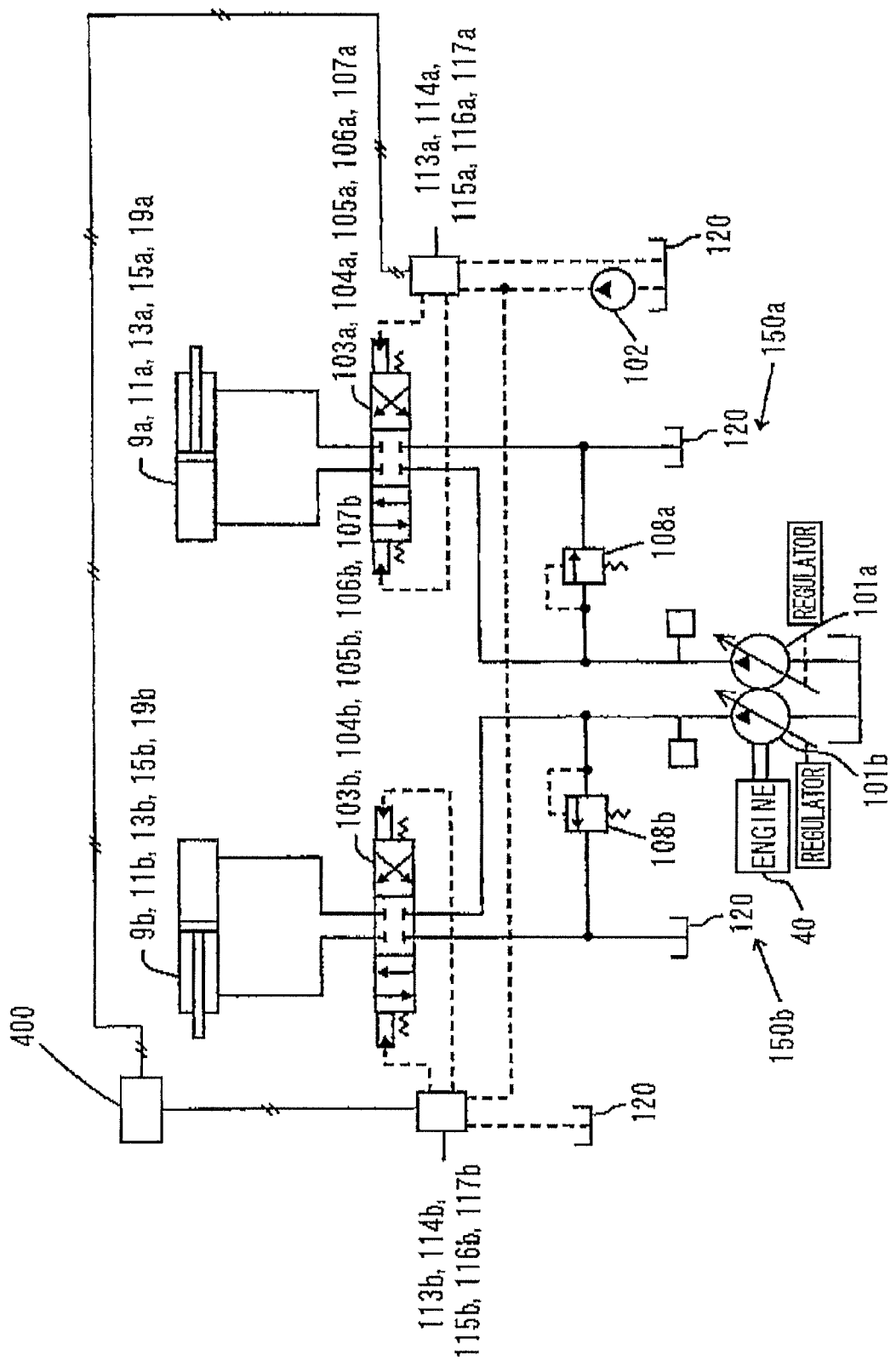
FIG. 4 is a figure schematically showing hydraulic circuitry.
Figure 5:
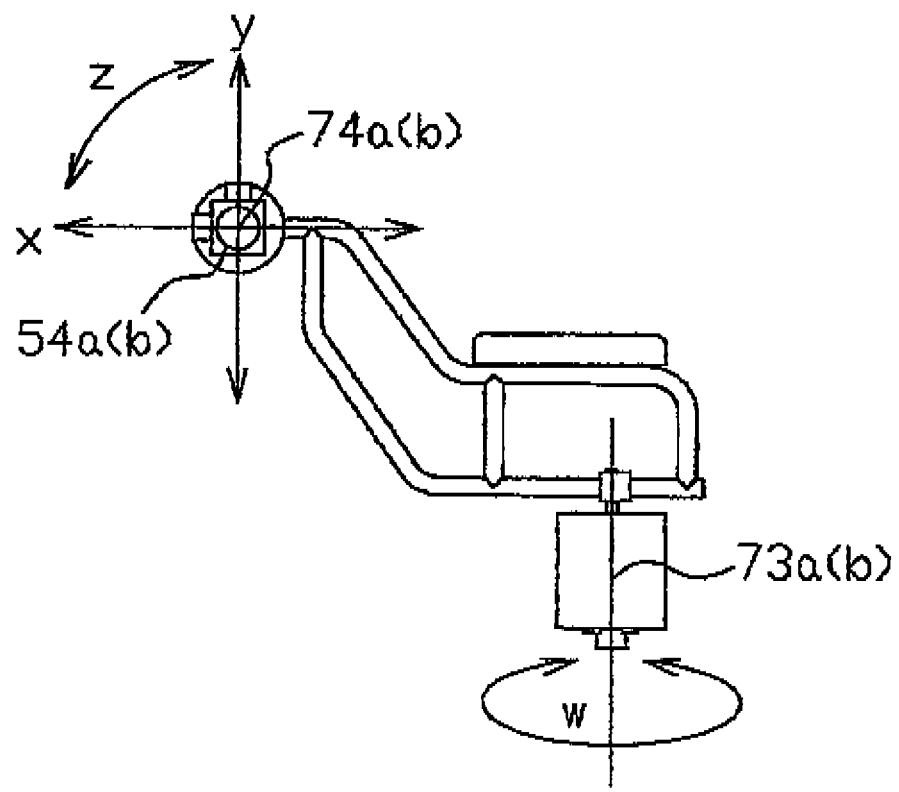
FIG. 5 is a figure for explanation of directions of operation of an operating device.
Figure 6:
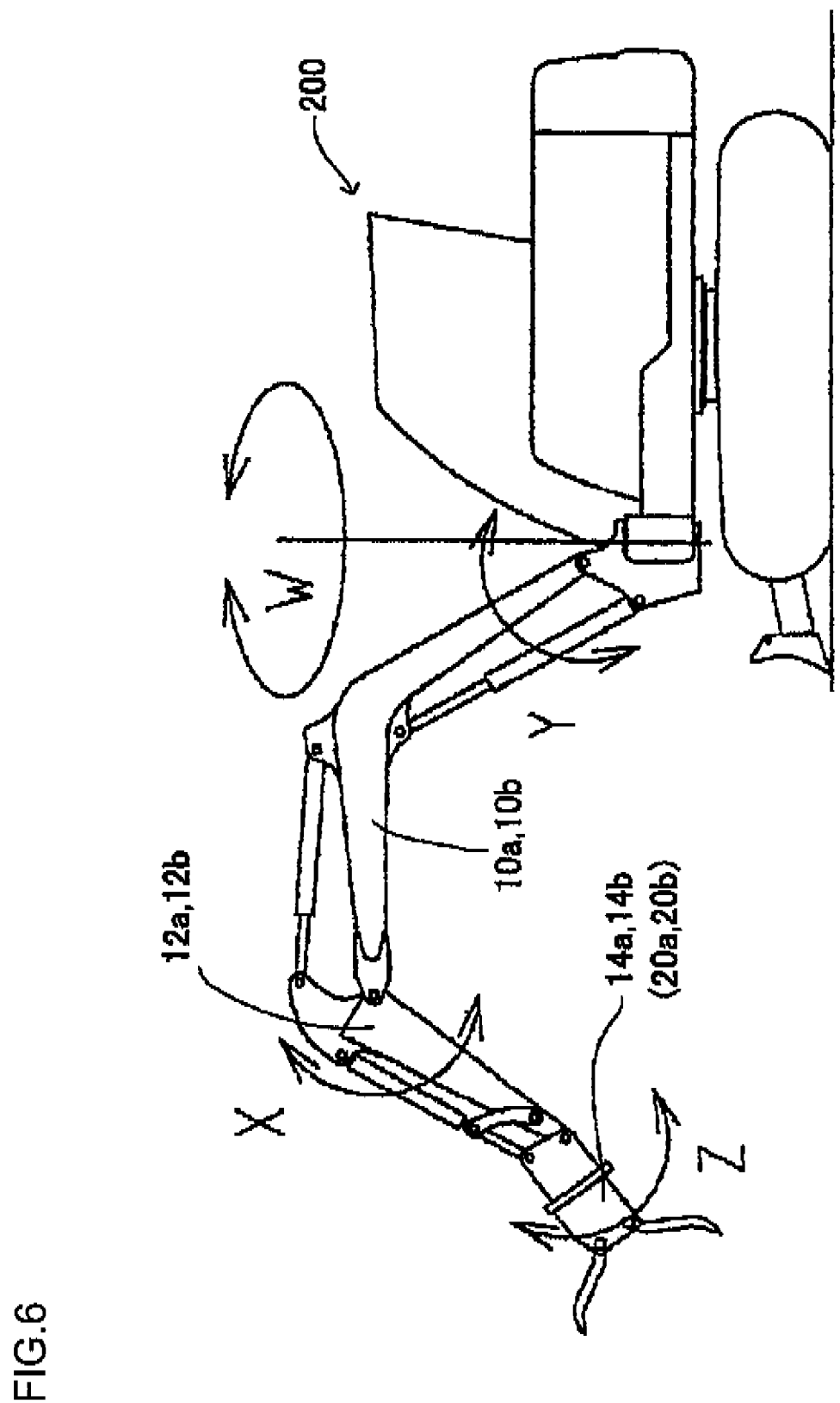
FIG. 6 is a figure for explanation of pivoting directions of a first front working machine and a second front working machine.

Furthermore, when the operator displaces the working tool operation switch 56a or the working tool operation switch 56b with his finger, if for example the grapples 20a and 20b are provided as the working tools 14a and 14b, then the grapple cylinder 19a or the grapple cylinder 19b shown in FIG. 4 extends or retracts. Due to this extension or retraction of the grapple cylinder 19a or of the grapple cylinder 19b, the grapple 20a or the grapple 20b opens or closes. At this time, the opening or closing speed of the grapple 20a or the grapple 20b bears a monotonically increasing relationship to the displacement amount of the working tool operation switch 56a or of the working tool operation switch 56b, for example a proportional relationship, so that the displacement of the working tool operation switch 56a or of the working tool operation switch 56b controls the speed of rotation of the working tool 14a or of the working tool 14b.

—Operation with the Operating Arms—

Yet further, when the operator swings the operating arm 52a or the operating arm 52b of the operating device 50a or the operating device 50b to the left or the right around the respective shaft 73a or 73b with his forearm (refer to the arrow sign "w" in FIG. 5), then the swing post cylinder 9a or the swing post cylinder 9b extends or retracts. Due to this, the swing post 7a or the swing post 7b is made to swing in the direction that agrees with the direction of displacement of the operating arm 52a or of the operating arm 52b (refer to the arrow sign "W" in FIG. 6). At this time, the swinging speed of the swing post 7a or the swing post 7b bears a monotonically increasing relationship to the displacement amount of the operating arm 52a or of the operating arm 52b, for example a proportional relationship, so that the displacement of the operating arm 52a or of the operating arm 52b controls the speed of swinging of the swing post 7a or the swing post 7b.

—Operation with the Operating Levers in the Dual-Arm Synchronization Mode—

When the operational mode is set to the dual-arm synchronization mode, and the right side operation device selection position is selected by the operating lever selection switch 61, and when the operator displaces the right side operating lever 54a in the up/down direction (refer to the arrow sign "y" in FIG. 5) with his palm, then the boom cylinder 11a of the first front working machine A and the boom cylinder 11b of the second front working machine B are both extended or retracted simultaneously. In this case, operation of the left side operating lever 54b in the up/down direction is ineffective, so that, even if the left side operating lever 54b is operated in the up/down direction, neither the boom cylinder 11a nor the boom cylinder 11b extends or retracts. Moreover, when the operational mode is set to the dual-arm synchronization mode, and the left side operation device selection position is selected by the operating lever selection switch 61, and when the operator displaces the left side operating lever 54b in the up/down direction (refer to the arrow sign "y" in FIG. 5) with his palm, then the boom cylinder 11a of the first front working machine A and the boom cylinder 11b of the second front working machine B are both extended or retracted simultaneously. In this case, operation of the right side operating lever 54a in the up/down direction becomes ineffective, so that, even if the right side operating lever 54a is operated in the up/down direction, neither the boom cylinder 11a nor the boom cylinder 11b extends or retracts.

Due to this, the right boom 10a and the left boom 10b can be pivoted simultaneously (refer to the arrow sign "Y" in FIG. 6) by operation either of the right side operating lever 54a or of the left side operating lever 54b in the up/down direction. At this time, the pivoting speeds of the boom 10a and of the boom 10b bear a monotonically increasing relationship to the displacement amount of the operating lever 54a or of the operating lever 54b, for example a proportional relationship, so that the displacement of the operating lever 54a or of the operating lever 54b controls the speed of pivoting of the boom 10a and of the boom 10b.

In a similar manner, when the operational mode is set to the dual-arm synchronization mode, and the right side operation device selection position is selected by the operating lever selection switch 61, and when the operator displaces the right side operating lever 54a in the forward/backward direction (refer to the arrow sign "x" in FIG. 5) with his palm, then the arm cylinder 13a of the first front working machine A and the arm cylinder 13b of the second front working machine B are both extended or retracted. In this case, operation of the left side operating lever 54b in the forward/backward direction becomes ineffective, so that, even if the left side operating lever 54b is operated in the forward/backward direction, neither the arm cylinder 13a nor the arm cylinder 13b extends or retracts. Moreover, when the operational mode is set to the dual-arm synchronization mode, and the left side operation device selection position is selected by the operating lever selection switch 61, and when the operator displaces the left side operating lever 54b in the forward/backward direction with his palm, then the arm cylinder 13a of the first front working machine A and the arm cylinder 13b of the second front working machine B are both extended or retracted. In this case, operation of the right side operating lever 54a in the forward/backward direction becomes ineffective, so that, even if the right side operating lever 54a is operated in the forward/backward direction, neither the arm cylinder 13a nor the arm cylinder 13b extends or retracts.

Due to this, the right and left arms 12a and 12b can be pivoted simultaneously (refer to the arrow sign "X" in FIG. 6) by operation of either the right side operating lever 54a or the left side operating lever 54b in the forward/backward direction. At this time, the pivoting speeds of the arm 12a and of the arm 12b bear a monotonically increasing relationship to the displacement amount of the operating lever 54a or of the operating lever 54b, for example a proportional relationship, so that the displacement of the operating lever 54a or of the operating lever 54b controls the speed of pivoting of the arm 12a and of the arm 12b.

—Operating with the Twist Grips in the Dual-Arm Synchronization Mode—

When the operational mode is set to the dual-arm synchronization mode, and the right side operation device selection position is selected by the operating lever selection switch 61, and when the operator rotates the right side working tool twist grip 55a around the central rotational axis line 74a with his palm (refer to the arrow sign "z" in FIG. 5), then the working tool cylinder 15a of the first front working machine A and the working tool cylinder 15b of the second front working machine B are both extended or retracted simultaneously. In this case, rotational operation of the left side working tool twist grip 55b becomes ineffective, so that, even if the left side working tool twist grip 55b is rotationally operated, neither the working tool cylinder 15a nor the working tool cylinder 15b extends or retracts. Moreover, when the operational mode is set to the dual-arm synchronization mode, and the left side operation device selection position is selected by the operating lever selection switch 61, and when the operator rotates the left side working tool twist grip 55b around the central rotational axis line 74b, then the working tool cylinder 15a of the first front working machine A and the working tool cylinder 15b of the second front working machine B are both extended or retracted simultaneously. In this case, rotational operation of the right side working tool twist grip 55a becomes ineffective, so that, even if the right side working tool twist grip 55a is rotationally operated, neither the working tool cylinder 15a nor the working tool cylinder 15b extends or retracts.

Due to this, by rotational operation either of the working tool twist grip 55a or of the working tool twist grip 55b, the right and left working tools 14a and 14b can be rotated simultaneously (refer to the arrow sign "Z" in FIG. 6) in rotational directions that agree with the direction of rotational operation of the working tool twist grip 55a or of the working tool twist grip 55b. At this time, the rotating speeds of the working tool 14a and of the working tool 14b bear a monotonically increasing relationship to the displacement amount of the twist grip 55a or of the twist grip 55b, for example a proportional relationship, so that the displacement of the twist grip 55a or of the twist grip 55b controls the speed of rotating of the working tool 14a and of the working tool 14b.

—The Hydraulic Circuitry—

FIG. 4 is a figure schematically showing hydraulic circuits 150a and 150b that drive the first front working machine A and the second front working machine B. 101a and 101b denote variable displacement type hydraulic pumps for providing main hydraulic pressure driven by an engine 40, and 102 denotes a pump for providing pilot hydraulic pressure. And 103a, 104a, 105a, 106a, and 107a are control valves that supply pressurized hydraulic fluid to, respectively, the swing cylinder 9a, the boom cylinder 11a, the arm cylinder 13a, the working tool cylinder 15a, and the grapple cylinder 19a of the first front working machine A.

The control valves 103a through 107a are respectively controlled by proportional control valves 113a, 114a, 115a, 116a, and 117a on the basis of output signals generated by an operation control device (i.e. a controller) 400 that will be described hereinafter. In other words, the proportional control valve 113a controls the control valve 103a, the proportional control valve 114a controls the control valve 104a, the proportional control valve 115a controls the control valve 105a, the proportional control valve 116a controls the control valve 106a, and the proportional control valve 117a controls the control valve 107a. And 108a denotes a main relief valve that regulates the maximum pressure of the hydraulic circuit 150a related to the first working machine A.

Pressurized hydraulic fluid discharged from the main pump 101a is supplied to the hydraulic cylinders via the control valves 103a through 107a. When the operating device 50a is operated, due to the operation of the electromagnetic proportional valves 113a through 117a according to the output signals of the controller 400, pilot pressurized hydraulic fluid discharged from the pump 102 is supplied to the corresponding control valves 103a through 107a, so that the spools of the control valves are driven according to the operational amounts of the operating device 50a. And, according to the drive amounts of these spools, the control valves 103a through 107a supply pressurized hydraulic fluid discharged from the main pump 101a to the respective cylinders (i.e., actuators) 9a, 11a, 13a, 15a, and 19a, and thereby drive those cylinders.

Since the hydraulic circuit 150b that drives the cylinders (i.e. actuators) 9b, 11b, 13b, 15b, and 19b of the second front working machine B has a structure that is similar to that of the hydraulic circuit 150a relating to the first front working machine A, accordingly detailed explanation thereof will be omitted. Due to these hydraulic circuits 150a and 150b, pressurized hydraulic fluid discharged from the main pump 101a is supplied to the cylinders 9a, 11a, 13a, 15a, and 19a of the first front working machine A, and moreover pressurized hydraulic fluid discharged from the main pump 101b is also supplied to the cylinders 9b, 11b, 13b, 15b, and 19b of the second front working machine B.

Figure 7:
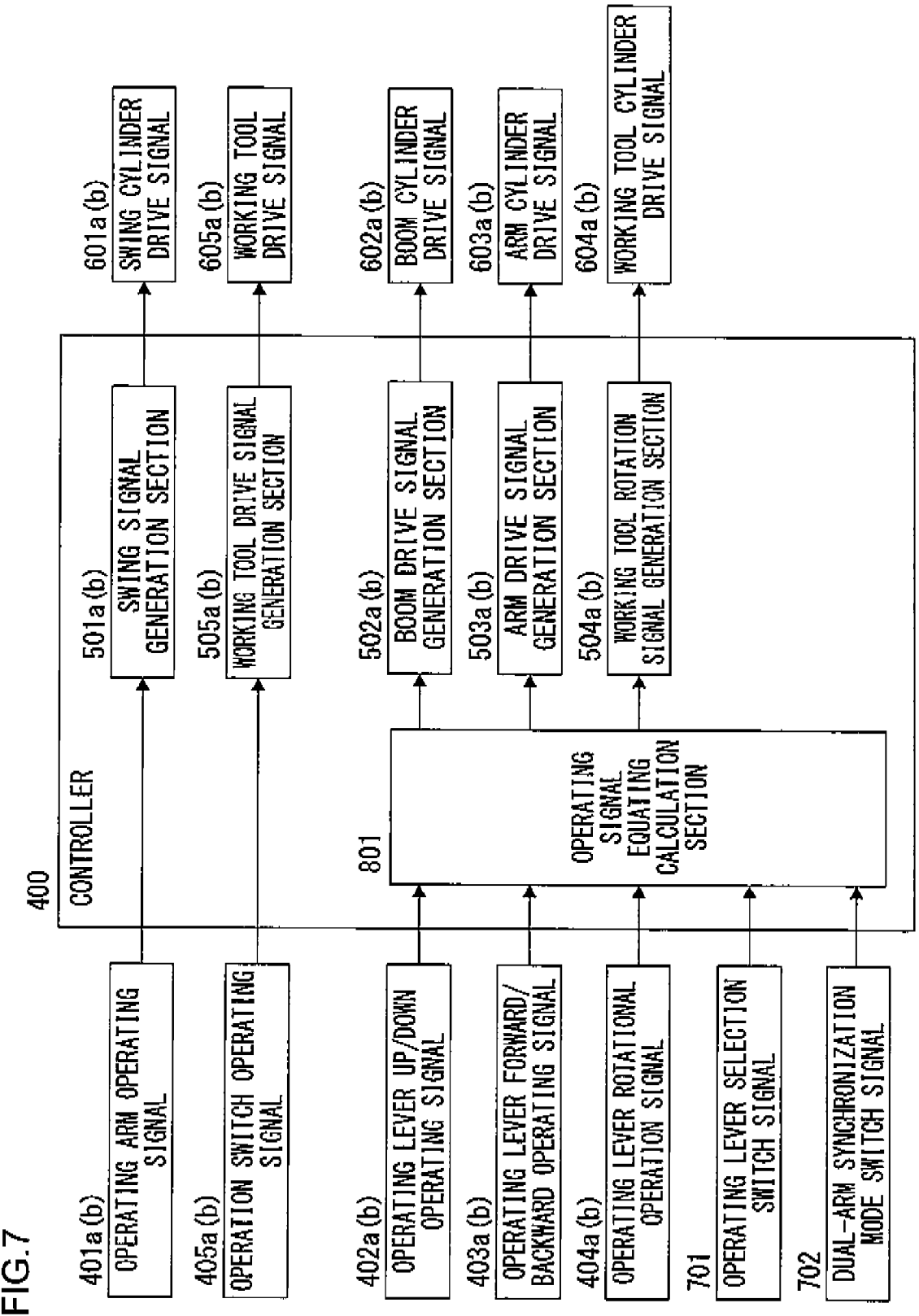
FIG. 7 is a schematic figure related to an operation control system of the first embodiment.

FIG. 7 is a schematic figure related to an operation control system of the first embodiment, Signals 401a(b) through 404a(b) that are inputted to the controller 400 are operating signals detected by the displacement sensors described above. That is to say, an operating arm operating signal 401a(b) is outputted from an operating arm displacement detector 57a(b). An operating lever up/down operating signal 402a(b) is outputted from an operating lever up/down direction displacement detector 581a(b). An operating lever forward/backward operating signal 403a(b) is outputted from an operating lever forward/backward direction displacement detector 582(b). A operating lever rotational operation signal 404a(b) is outputted from a twist grip displacement detector 59a(b). And an operation switch operating signal 405a(b) is outputted from an operation switch displacement detector 60a(b).

Moreover, an operating lever selection switch signal 701 is outputted from the operating lever selection switch 61.

And a dual-arm synchronization mode switch signal 702 is outputted from the dual-arm synchronization mode switch 62.

Signals 601a(b) through 605a(b) outputted by the controller 400 are drive signals that drive, respectively, the swing cylinder 9a(b), the boom cylinder 11a(b), the arm cylinder 13a(b), the working tool cylinder 15a(b), and the grapple cylinder 19a(b) described above. That is to say, a swing cylinder drive signal 601a(b) is outputted to the proportional control valve 113a(b) of FIG. 4, a boom cylinder drive signal 602a(b) is outputted to the proportional control valve 114a(b) of FIG. 4, and an arm cylinder drive signal 603a(b) is outputted to the proportional control valve 115a(b) of FIG. 4. Moreover, a working tool cylinder drive signal 604a(b) is outputted to the proportional control valve 116a(b) of FIG. 4, and a working tool drive signal 605a(b) is outputted to the proportional control valve 117a(b) of FIG. 4.

The reference symbols 501a(b) through 505a(b) within the controller 400 denote drive signal generation sections that calculate the drive signals described above from the operating signals described above. That is to say, a swing signal generation section 501a(b) generates and outputs the swing cylinder drive signal 601a(b), a boom drive signal generation section 502a(b) generates and outputs the boom cylinder drive signal 602a(b), and an arm drive signal generation section 503a(b) generates and outputs the arm cylinder drive signal 603a(b). And a working tool rotation signal generation section 504a(b) generates and outputs the working tool cylinder drive signal 604a(b), while a working tool drive signal generation section 505a(b) generates and outputs the working tool drive signal 605a(b).

Figure 8:
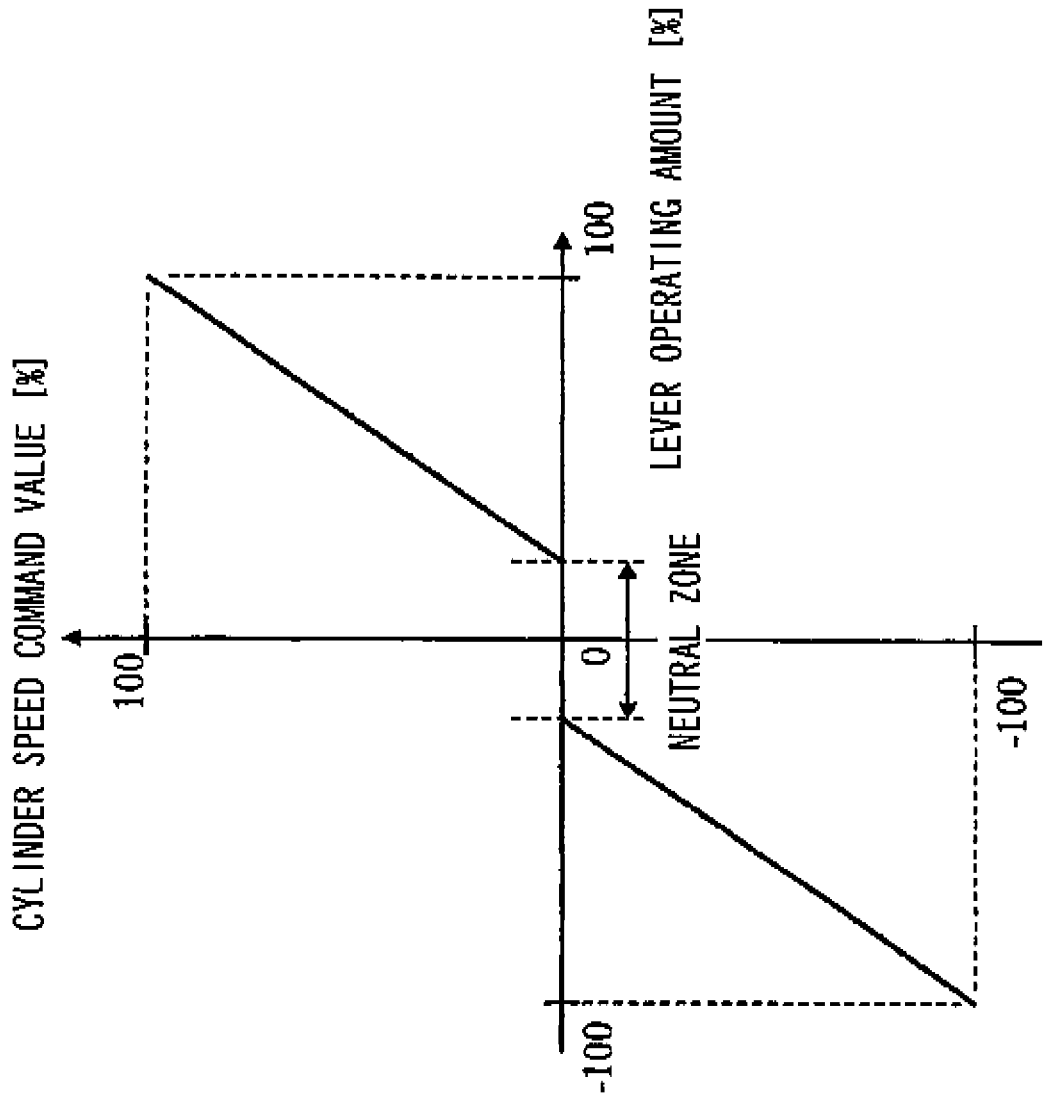
FIG. 8 is a schematic figure related to signal processing performed by various signal generation sections.

FIG. 8 is a schematic figure related to signal processing performed by the signal generation sections 501a(b) through 505a(b), and schematically shows relationships between the operating signals described above and the drive signals described above. Cylinder speed command values that are proportional to the amounts of operation of the operating levers 54a(b) and so on are calculated as drive signals by the drive signal generation sections 501a(b) through 505a(b). It should be understood that neutral zones are set, in order to prescribe operational amounts for operating the levers to become effective.

In FIG. 7, an input signal 701 is a signal that specifies the set state of the operating lever selection switch 61, and this signal is outputted from the operating lever selection switch 61. And an input signal 702 is a signal that specifies the set state of the dual-arm synchronization mode switch 62, and this signal is outputted from the dual-arm synchronization mode switch 62. The set states of the input signals 701 and 702 can be changed as appropriate by the operator operating the operating lever selection switch 61 and the dual-arm synchronization mode switch 62 respectively. And each of the input signals 402a(b) through 404a(b) from the operating levers and so on, the operating lever selection switch signal 701, and the dual-arm synchronization mode switch signal 702 is inputted to an operating signal equating calculation section 801 that will be described hereinafter.

—Processing by the Operating Signal Equating Calculation Section 801—

Figure 9:
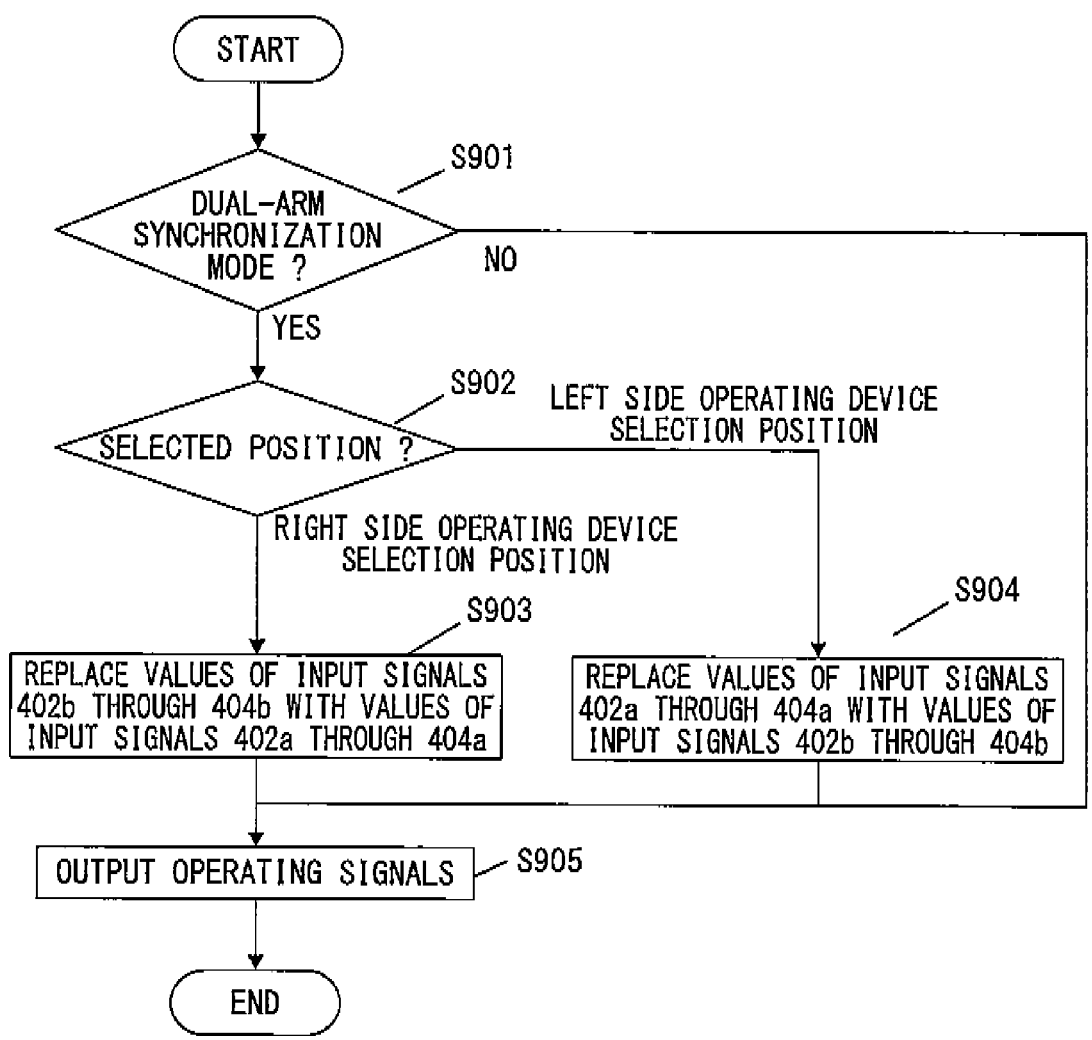
FIG. 9 is a flow chart showing the flow of processing of an operating signal equating calculation section of the first embodiment.

FIG. 9 is a flow chart showing the flow of processing by the operating signal equating calculation section 801. When an ignition switch not shown in the figures of the work machine 200 is turned to ON, a program that performs the processing shown in FIG. 9 is started, and is repeatedly executed by the operating signal equating calculation section 801. In a first step S901, the dual-arm synchronization mode switch signal 702 specifying the set state of the dual-arm synchronization mode switch 62 is read in, and a decision is made as to whether or not the operational mode is set to the dual-arm synchronization mode.

If an affirmative decision is reached in the step S901, in other words if the operational mode is set to the dual-arm synchronization mode and synchronization of the two arms is permitted, then the flow of control proceeds to a step S902. In this step S902 the operating lever selection switch signal 701 is read in, and a decision is made as to whether the selected position of the operating lever selection switch 61 is the right side operating device selection position or is the left side operating device selection position.

If in the step S902 it is decided that the selected position of the operating lever selection switch 61 is the right side operating device selection position, then the flow of control proceeds to a step S903, processing is performed to overwrite the operating signal of the operating lever 54b with the operating signal of the operating lever 54a, and processing is performed to overwrite the operating signal of the working tool twist grip 55b with the operating signal of the working tool twist grip 55a. In concrete terms, processing is implemented to replace the values of the input signals 402b through 404b, irrespective of these values, with the values of the input signals 402a through 404a (thus making them the same i.e. equating them). As a result, the operating lever up/down operating signal 402b is replaced, irrespective of its value, with the value of the operating lever up/down signal 402a. And the operating lever forward/backward operating signal 402b is replaced, irrespective of its value, with the value of the operating lever forward/backward operating signal 403a. Moreover, the twist grip rotational operation signal 404b is replaced, irrespective of its value, with the value of the twist grip rotational operation signal 404a. In other words, the operating lever up/down operating signal 402a, the operating lever forward/backward operating signal 403a, and the twist grip rotational operation signal 404a are promoted to be common signals in order to drive both the left and the right actuators together using those common signals.

When the step S903 has been executed the flow of control is transferred to a step S905, and the operating signals after the processing in the step S903 are outputted to the signal generation sections 502a through 504a and to the signal generation sections 502b through 504b. In other words, the operating lever up/down operating signal 402a is outputted to the boom drive signal generation section 502a. The operating lever forward/backward operating signal 403a is outputted to the arm drive signal generation section 503a. And the twist grip rotational operation signal 404a is outputted to the working tool rotation signal generation section 504a.

And the operating lever up/down operating signal 402a is outputted to the boom drive signal generation section 502b, instead of the operating lever up/down operating signal 402b. Moreover, the operating lever forward/backward operating signal 403a is outputted to the arm drive signal generation section 503b, instead of the operating lever forward/backward operating signal 403b. Also, the operating lever rotational operational signal 404a is outputted to the working tool rotation signal generation section 504b, instead of the twist grip rotational operation signal 404b. And when the step S905 has been this program terminates.

On the other hand, if in the step S902 it is decided that the selected position of the operating lever selection switch 61 is the left side operating device selection position, then the flow of control proceeds to a step S904, processing is performed to overwrite the operating signal of the operating lever 54a with the operating signal of the operating lever 54b, and processing is performed to overwrite the operating signal of the working tool twist grip 55a with the operating signal of the working tool twist grip 55b. In concrete terms, processing is implemented to replace the values of the input signals 402a through 404a, irrespective of these values, with the values of the input signals 402b through 404b (i.e. to make them the same). As a result, the operating lever up/down operating signal 402a is replaced, irrespective of its value, with the value of the operating lever up/down signal 402b. And the operating lever forward/backward operating signal 402a is replaced, irrespective of its value, with the value of the operating lever forward/backward operating signal 403b. Moreover, the twist grip rotational operation signal 404a is replaced, irrespective of its value, with the value of the twist grip rotational operation signal 404b. In other words, the operating lever up/down operating signal 402b, the operating lever forward/backward operating signal 403b, and the twist grip rotational operation signal 404b are promoted to be common signals in order to drive both the left and the right actuators together using those common signals.

When the step S904 has been executed the flow of control is transferred to the step S905, and the operating signals after the processing in the step S904 are outputted to the signal generation sections 502a through 504a and to the signal generation sections 502b through 504b. In other words, the operating lever up/down operating signal 402b is outputted to the boom drive signal generation section 502a, instead of the operating lever up/down operating signal 402a. The operating lever forward/backward operating signal 403b is outputted to the arm drive signal generation section 503a, instead of the operating lever up/down operating signal 402a. And the twist grip rotational operation signal 404a is outputted to the working tool rotation signal generation section 504a, instead of the twist grip rotational operation signal 404a.

And the operating lever up/down operating signal 402b is outputted to the boom drive signal generation section 502b. Moreover, the operating lever forward/backward operating signal 403b is outputted to the arm drive signal generation section 503b. Also, the operating lever rotational operational signal 404b is outputted to the working tool rotation signal generation section 504b.

On the other hand if a negative decision has been reached in the step S901, in other words if the operational mode is set to the normal mode so that dual-aim synchronization is not permitted, then the flow of control is transferred to the step S905. In other words, if a negative decision has been reached in the step S901, then processing for overwriting the operating signals such as that performed in the steps S903 and S904 is not performed, but each of the input signals 402a through 404a is outputted to the corresponding signal generation sections 502a through 504a, and each of the input signals 402b through 404b is outputted to the corresponding signal generation sections 502b through 504b. In concrete terms, the operating lever up/down operating signal 402a is outputted to the boom drive signal generation section 502a. The operating lever forward/backward operating signal 403a is outputted to the arm drive signal generation section 503a. And the twist grip rotational operation signal 404a is outputted to the working tool rotation signal generation section 504a.

Moreover, the operating lever up/down operating signal 402b is outputted to the boom drive signal generation section 502b. The operating lever forward/backward operating signal 403b is outputted to the arm drive signal generation section 503b. And the twist grip rotational operation signal 404b is outputted to the working tool rotation signal generation section 504b.

In this manner, with this work machine 200 of the first embodiment, when the operational mode is set to the dual-arm synchronization mode, if the right side operating device selection position is selected with the operating lever selection switch 61, then the processing of the step S903 described above is performed. As a result it becomes possible to perform dual-arm synchronized operation, i.e., in concrete terms, synchronized operation of the booms 10a and 10b and the arms 12a and 12b of the first front working machine A and of the second front working machine B, only by operating the operating lever 54a. Furthermore it becomes possible to perform dual-arm synchronized operation i.e., in concrete terms, synchronized operation of the grapple 20a and the grapple 20b of the first front working machine A and of the second front working machine B, only by operating the working tool twist grip 55a.

And, with the work machine 200 of the first embodiment, when the operational mode is set to the dual-arm synchronization mode and the left side operating device selection position is selected with the operating lever selection switch 61, then the processing of the step S904 described above is performed. As a result it becomes possible to perform dual-arm synchronized operation, i.e., in concrete terms, synchronized operation of the booms 10a and 10b and the arms 12a and 12b of the first front working machine A and of the second front working machine B, only by operating the operating lever 54b. Furthermore it becomes possible to perform dual-arm synchronized operation i.e., in concrete terms, synchronized operation of the grapple 20a and the grapple 20b of the first front working machine A and of the second front working machine B, only by operating the working tool twist grip 55b.

And, with the work machine 200 of this first embodiment, when the operational mode is set to the normal mode, then the processing of the steps S903 and S904 described above is not performed. Accordingly, in this case, it becomes possible to operate the two arms by using the operating levers 54a and 54b and the working tool twist grips 55a and 55b respectively corresponding to each of them, as in the prior art.

It should be understood that, when dual-arm synchronized operation as described above starts, if the attitude of the first front working machine A (i.e. its initial attitude) is different from the attitude of the second front working machine B (i.e. its initial attitude), then the relative position of the right and left grapples 20a and 20b will change due to the dual-arm synchronized operation, and this may be undesirable. Due to this, there is a danger that a work object that is being grasped by the grapples 20a and 20b may be damaged due to the dual-arm synchronized operation. However, with this work machine 200 of the first embodiment, if an attempt is made to grasp a work object with the right and left grapples 20a and 20b, then the first front working machine A and the second front working machine B will naturally assume attitudes that are approximately the same.

Here, the attitude of the first working machine A is defined by the swing angle of the swing post 7a with respect to the revolving upperstructure 3, the pivoting angle of the boom 10a with respect to the swing post 7a, the pivoting angle of the arm 12a with respect to the boom 10a, and the pivoting angle of the first working tool 14a with respect to the arm 12a. In a similar manner, the attitude of the second working machine B is defined by the swing angle of the swing post 7b with respect to the revolving upperstructure 3, the pivoting angle of the boom 10b with respect to the swing post 7b, the pivoting angle of the arm 12b with respect to the boom 10a, and the pivoting angle of the second working tool 14b with respect to the arm 12b.

In other words, provided that the operator of this work machine 200 does not intentionally make the attitude of the first front working machine A and the attitude of the second front working machine B be different, during normal working, the initial attitude of the first front working machine A and the initial attitude of the second front working machine B will be approximately the same. Due to this, during normal working, the requirement is low for making a decision, as a condition for starting dual-arm synchronized operation, as to whether or not the initial attitude of the first front working machine A and the initial attitude of the second front working machine B are approximately the same. Accordingly with the work machine 200 of this first embodiment it is not proposed, as a condition for starting dual-arm synchronized operation, that the initial attitudes of the first front working machine A and of the second front working machine B are obtained. It should be understood that, with this work machine 200 of the first embodiment, it is desirable that dual-arm synchronized operation should only be started after it has been confirmed, by visual inspection by the operator or by a workman on the ground, that the attitude of the first front working machine A and the attitude of the second front working machine B are approximately the same.

The work machine 200 according to the first embodiment described above provides the following operations and beneficial effects.

(1) When the operational mode is set to the dual-arm synchronization mode, it is arranged for shared signals (i.e. shared drive commands) for driving the right and left actuators with common signals to be generated by the operating signal equating calculation section 801 on the basis of either the input signals 402a through 404a, or the input signals 402b through 404b, according to the selected position of the operating lever selection switch 61. Due to this, it is possible to implement synchronized operation of the first front working machine A and the second front working machine B with a convenient structure, and it is thus possible to provide a dual-arm work machine that can be applied to a wide variety of tasks at low cost. In other words, it is possible to suppress increase of cost, since dual-arm synchronized operation becomes possible without adding any modification to the first front working machine A or to the second front working machine B.

(2) It is arranged for the operational mode to be changed over by operation of the dual-arm synchronization mode switch 62 by the operator. Due to this, operation in accordance with the will of the operator becomes possible, and the ease of use is enhanced, since it is possible reliably to reflect the intention of the operator to change over the operational mode.

(3) When the dual-arm synchronization mode is set, it is arranged for it to be possible, due to operation by the operator, to change over the selected position of the operating lever selection switch 61, and to select between performing dual-arm synchronized operation with the right side operating device 50a and performing that operation with the left side operating device 50b. Due to this, the ease of use is enhanced, since the operator is able to perform dual-arm synchronized operation with the one of his arms that he finds easier to use, typically his dominant arm.

Embodiment #2

A second embodiment of the dual-arm work machine according to the present invention will now be explained with reference to FIGS. 10 through 13. In the following explanation, structural elements that are the same as in the first embodiment will be denoted by the same reference symbols, and the explanation will principally focus upon the features of difference. Points that are not particularly explained are the same as in the first embodiment. In this embodiment, principally, the feature of difference from the first embodiment is that a decision is made as to whether to make dual-arm synchronized operation possible, on the basis of the directions of operation of the operating levers 54a and 54b and the twist grips 55a and 55b.

—The Operating Apparatus—

Figure 10:
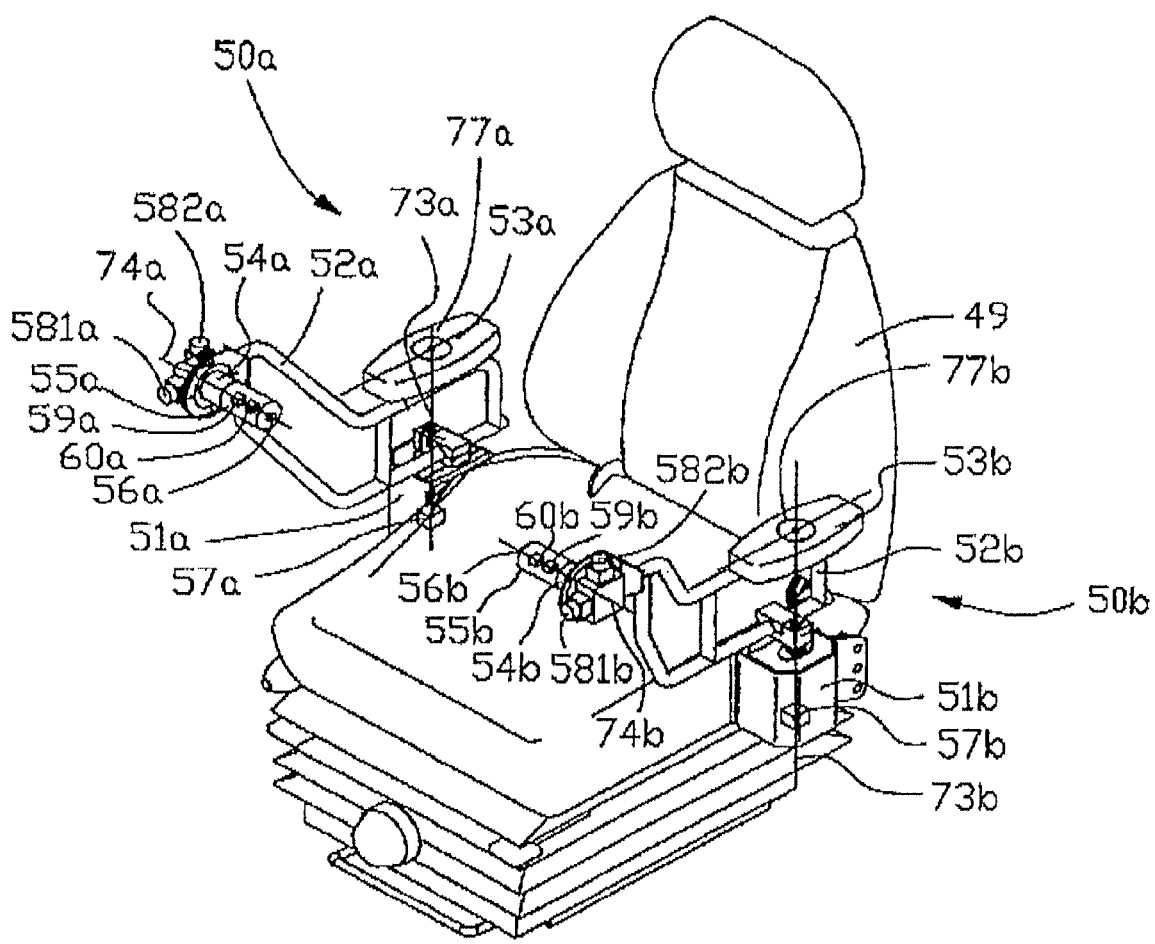
FIG. 10 is a figure showing an operating device of a second embodiment.

FIG. 10 is a figure showing the operating apparatus of the second embodiment. The difference between the operating devices 50a and 50b of the second embodiment and those of the first embodiment is that the operating lever selection switch 61 and the dual-arm synchronization mode switch 62 are not provided.

—Regarding Dual-Arm Synchronized Operation—

In this second embodiment, dual-arm synchronized operation becomes possible when all of the following conditions (2-1) through (2-3) are satisfied.

(2-1) The up/down operating direction is the same for both the right side operating lever 54a and the left side operating lever 54b, or neither the right side operating lever 54a nor the left side operating lever 54b is being operated in the up/down direction.

(2-2) The forward/backward operating direction is the same for both the right side operating lever 54a and the left side operating lever 54b, or neither the right side operating lever 54a nor the left side operating lever 54b is being operated in the forward/backward direction.

(2-3) The operating direction (i.e. the rotational direction) is the same for both the right side twist grip 55a and the left side twist grip 55b, or neither the right side twist grip 55a nor the left side twist grip 55b is being rotationally operated.

When all of the conditions (2-1) through (2-3) described above are satisfied so that dual-arm synchronized operation becomes possible, then the right and left booms 10a and 10b and the right and left arms 12a and 12b are rotated simultaneously according to the operating amount of that operating lever, among the right side operating lever 54a and the left side operating lever 54b, whose amount of displacement (i.e. amount of operation) is the greater. In concrete terms, the right and left booms 10a and 10b are rotated simultaneously according to the operating amount of that operating lever, among the right side operating lever 54a and the left side operating lever 54b, whose amount of operation in the up/down direction is the greater. And the right and left arms 12a and 12b are rotated simultaneously according to the operating amount of that operating lever, among the right side operating lever 54a and the left side operating lever 54b, whose amount of operation in the forward/backward direction is the greater. Furthermore, the right and left working tools 14a and 14b are rotated simultaneously according to the amount of rotational operation of that twist grip, among the right side twist grip 55a and the left side twist grip 55b, whose displacement amount (i.e. amount of rotational operation) is the greater.

Figure 11:
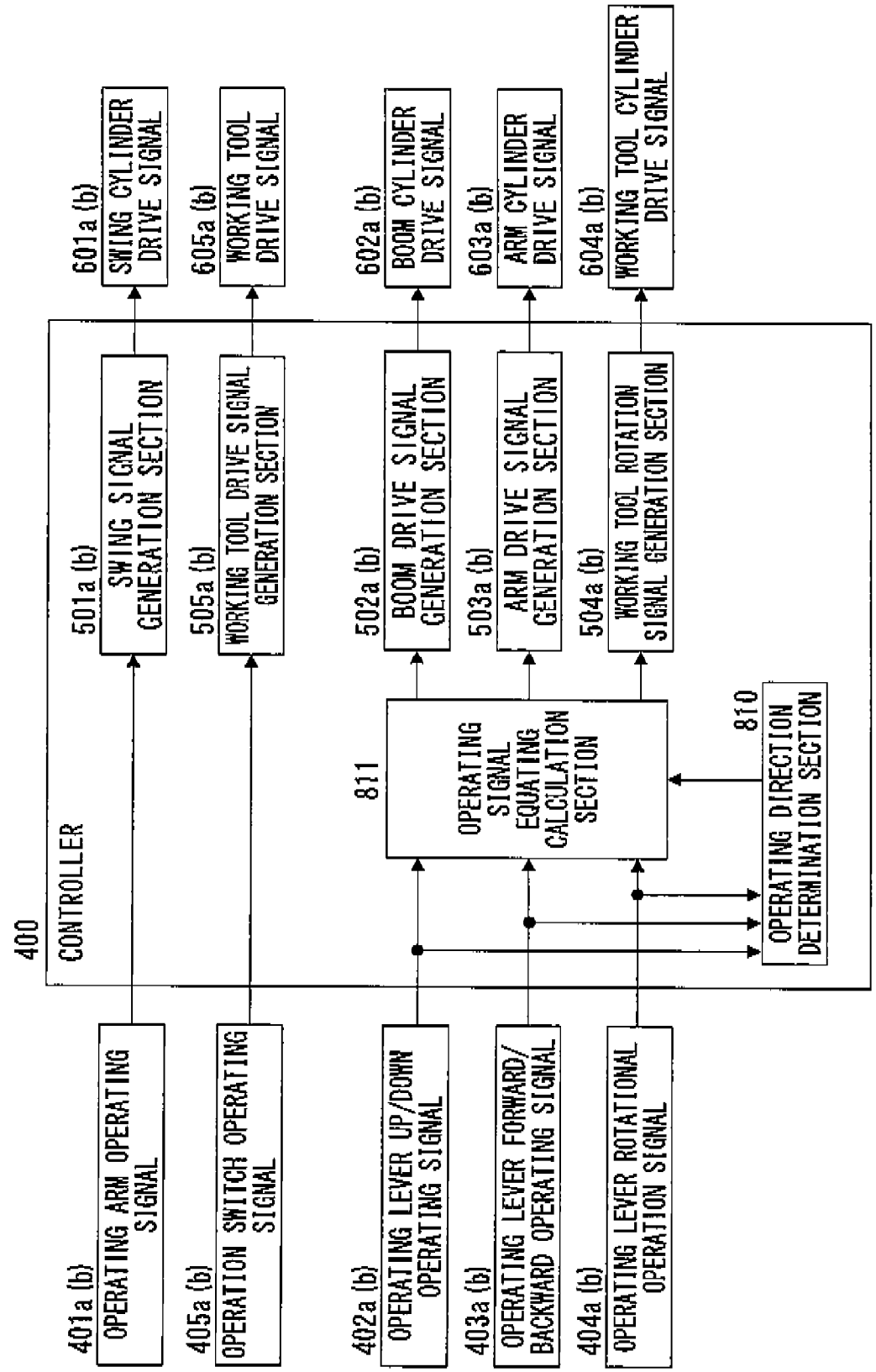
FIG. 11 is a schematic figure related to an operation control system of the second embodiment.

FIG. 11 is a schematic figure related to the operation control system of the second embodiment. An operating direction determination section 810 and an operating signal equating calculation section 811 are provided to a controller 400. The input signals 402a(b) through 404a(b) from the operating levers and so on are read in to the operating direction determination section 810. And the input signals 402a(b) through 404a(b) from the operating levers and so on and the result of determination by the operating direction determination section 810 are inputted to the operating signal equating calculation section 811.

—Processing Performed by the Operating Direction Determination Section 810—

Figure 12:
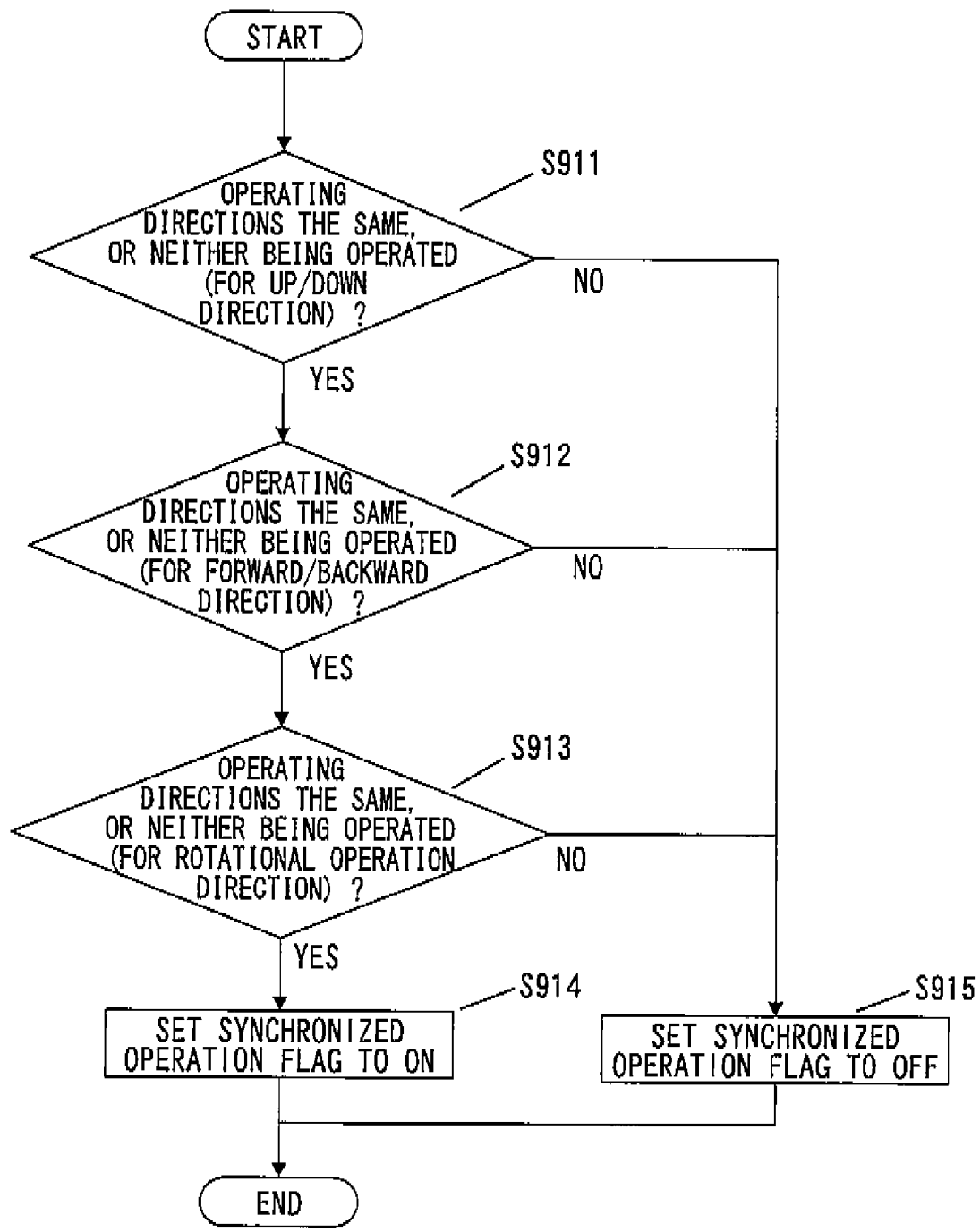
FIG. 12 is a flow chart showing the flow of processing of an operating direction determination section of the second embodiment.

FIG. 12 is a flow chart showing the flow of processing by the operating direction determination section 810. When the ignition switch not shown in the figures of the working machine 200 is turned to ON, a program that performs the processing shown in FIG. 12 is started, and is repeatedly executed by the operating direction determination section 810. It should be understood that this program is a program for making a decision as to whether or not all of the conditions (2-1) through (2-3) described above are satisfied.

First, in a step S911, it is determined whether or not the condition (2-1) described above is satisfied, on the basis of the operating lever up/down operating signal 402a and the operating lever up/down operating signal 402b. If it is determined that the condition (2-1) described above is satisfied, in other words if it is determined that the operating directions in the up/down direction of both the right side operating lever 54a and the left side operating lever 54b are the same, or that neither the right side operating lever 54a nor the left side operating lever 54b is being operated in the up/down direction, then the flow of control proceeds to a step S912.

In the step S912, it is determined whether or not the condition (2-2) described above is satisfied, on the basis of the operating lever forward/backward operating signal 403a and the operating lever forward/backward operating signal 403b. If it is determined that the condition (2-2) described above is satisfied, in other words if it is determined that the operating directions in the forward/backward direction of both the right side operating lever 54a and the left side operating lever 54b are the same, or that neither the right side operating lever 54a nor the left side operating lever 54b is being operated in the forward/backward direction, then the flow of control proceeds to a step S913.

In the step S913, it is determined whether or not the condition (2-3) described above is satisfied, on the basis of the twist grip rotational operation signal 404a and the twist grip rotational operation signal 404b. If it is determined that the condition (2-3) described above is satisfied, in other words if it is determined that the operating directions (i.e. the directions of rotational operation) of both the right side twist grip 55a and the left side twist grip 55b are the same, or that neither the right side twist grip 55a nor the left side twist grip 55b is being rotationally operated, then the flow of control proceeds to a step S914.

In the step S914, it is considered that synchronized operation is to be performed, so that processing is performed to set a synchronized operation flag to ON. When this step S914 has been executed, this program terminates.

However, if a negative decision is reached in the step S911, a negative decision is reached in the step S912, or a negative decision is reached in the step S913, then the flow of control is transferred to a step S915, and it is considered that synchronized operation is not to be performed, so that processing is performed to set the synchronized operation flag to OFF. When this step S915 has been executed, this program terminates. In this manner, the operating direction determination section 810 also functions as a synchronized operation decision section that makes a decision as to whether or not the operating directions of the right side operating lever 54a and the left side operating lever 54b are the same or not, and whether the operating directions of the right side twist grip 55a and the left side twist grip 55b are the same or not.

—Processing Performed by the Operating Signal Equating Calculation Section 811—

Figure 13:
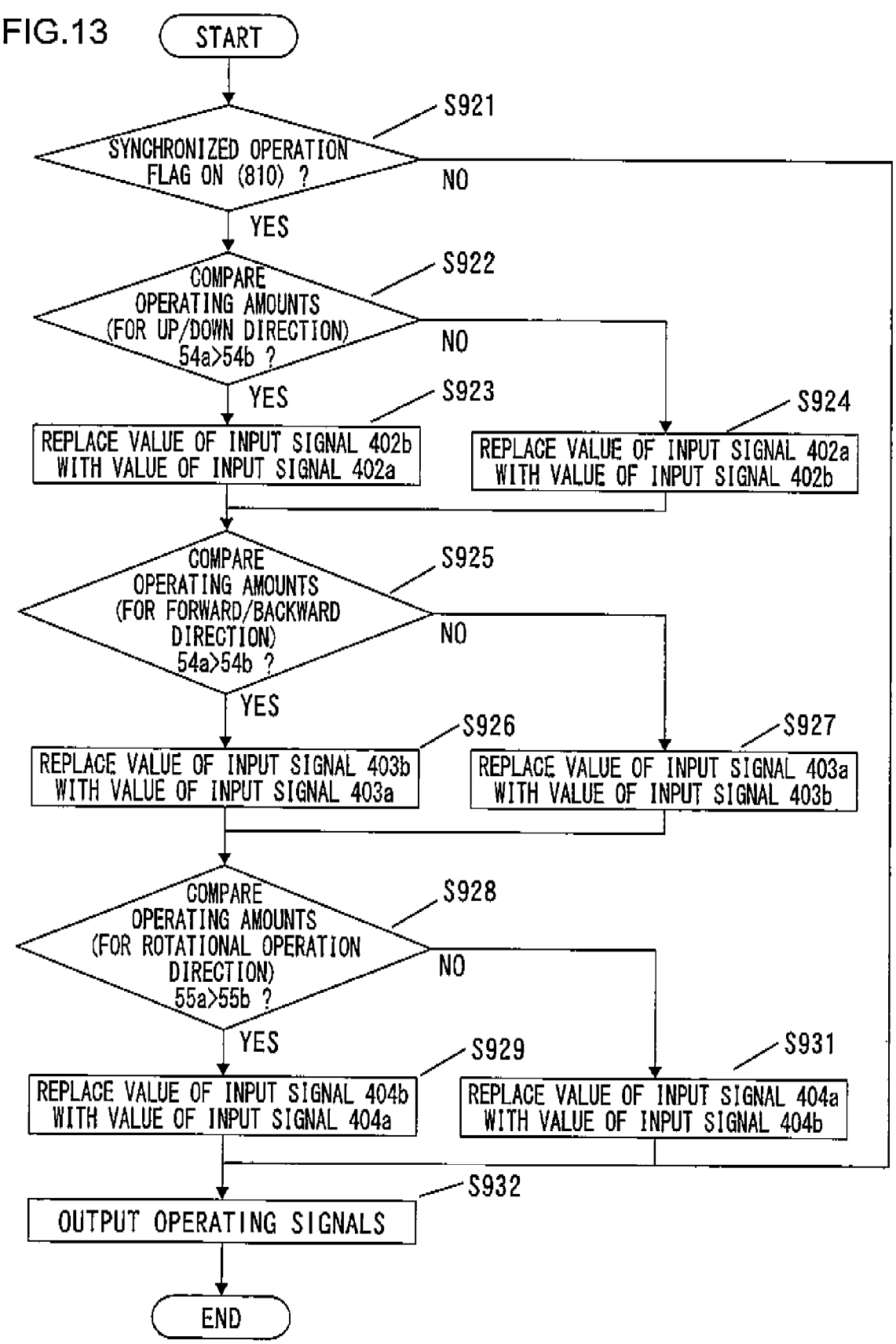
FIG. 13 is a flow chart showing the flow of processing of an operating signal equating calculation section of the second embodiment.

FIG. 13 is a flow chart showing the flow of processing by the operating signal equating calculation section 811. When the ignition switch not shown in the figures of the working machine 200 is turned to ON, a program that performs the processing shown in FIG. 13 is started, and is repeatedly executed by the operating signal equating calculation section 811. First, if it is decided in a step S921 that the synchronized operation flag that is the result of processing by the operating direction determination section 810 is set to ON, then the flow of control proceeds to a step S922.

In the step S922, comparison together of the magnitudes of the operating amounts in the up/down direction of the operating lever 54a and the operating lever 54b is performed. And, if the operating amount in the up/down direction of the right side operating lever 54a is greater than the operating amount in the up/down direction of the left side operating lever 54b, then the flow of control proceeds to a step S923, whereas if it is not then the flow of control is transferred to a step S924. In the step S923, processing is performed to overwrite the up/down operating signal 402b of the operating lever 54b with the up/down operating signal 402a of the operating lever 54a; in concrete terms, processing is performed to replace the value of the input signal 402b, irrespective of its value, with the value of the input signal 402a (i.e. to make them be the same). Moreover, in the step S924, processing is performed to overwrite the up/down operating signal 402a of the operating lever 54a with the up/down operating signal 402b of the operating lever 54b; in concrete terms, processing is performed to replace the value of the input signal 402a, irrespective of its value, with the value of the input signal 402b (i.e. to make them be the same). When the step S923 or the step S924 has been executed, then the flow of control proceeds to a step S925.

In the step S925, comparison together of the magnitudes of the operating amounts in the forward/backward direction of the operating lever 54a and the operating lever 54b is performed. And, if the operating amount in the forward/backward direction of the right side operating lever 54a is greater than the operating amount in the forward/backward direction of the left side operating lever 54b, then the flow of control proceeds to a step S926, whereas if it is not then the flow of control is transferred to a step S927. In the step S926, processing is performed to overwrite the forward/backward operating signal 403b of the operating lever 54b with the forward/backward operating signal 403a of the operating lever 54a; in concrete terms, processing is performed to replace the value of the input signal 403b, irrespective of its value, with the value of the input signal 403a (i.e. to make them be the same). Moreover, in the step S927, processing is performed to overwrite the forward/backward operating signal 403a of the operating lever 54a with the forward/backward operating signal 403b of the operating lever 54b; in concrete terms, processing is performed to replace the value of the input signal 403a, irrespective of its value, with the value of the input signal 403b (i.e. to make them be the same). When the step S926 or the step S927 has been executed, then the flow of control proceeds to a step S928.

In the step S928, comparison together of the magnitudes of the operating amounts (i.e. the amounts of rotation) of the working tool twist grip 55*a* and the working tool twist grip 55*b* is performed. And, if the operating amount of the right side working tool twist grip 55*a* is greater than the operating amount of the left side working tool twist grip 55*b*, then the flow of control proceeds to a step S929, whereas if it is not then the flow of control is transferred to a step S931. In the step S929, processing is performed to overwrite the twist grip rotational operation signal 404*b* of the working tool twist grip 55*b* with the twist grip rotational operation signal 404*a* of the working tool twist grip 55*a*; in concrete terms, processing is performed to replace the value of the input signal 404*b*, irrespective of its value, with the value of the input signal 404*a* (i.e. to make them be the same). Moreover, in the step S931, processing is performed to overwrite the twist grip rotational operation signal 404*a* of the working tool twist grip 55*a* with the twist grip rotational operation signal 404*b* of the working tool twist grip 55*b*; in concrete terms, processing is performed to replace the value of the input signal 404*a*, irrespective of its value, with the value of the input signal 404*b* (i.e. to make them be the same).

After the step S929 or the step S931 has been executed the flow of control is transferred to a step S932, and the operating signals after the processing of the steps described above are outputted to the signal generation sections 502*a* through 504*a* and to the signal generation sections 502*b* through 504*b*. In other words, the operating lever up/down operating signal 402*a* and the operating lever up/down operating signal 402*b* are compared together, and the larger one of these signals is outputted to the boom drive signal generation sections 502*a* and 502*b*. And the operating lever forward/backward operating signal 403*a* and the operating lever forward/backward operating signal 403*b* are compared together, and the larger one of these signals is outputted to the arm drive signal generation sections 503*a* and 503*b*. Moreover, the twist grip rotational operation signal 404*a* and the twist grip rotational operation signal 404*b* are compared together, and the larger one of these signals is outputted to the working tool rotation signal generation sections 504*a* and 504*b*. And, when this step S932 has been executed, the program terminates.

But if in the step S921 it is decided that the synchronized operation flag that is the result of processing by the operating direction determination section 810 is set to OFF, then the flow of control is transferred to the step S932. In this case, processing such as that performed by the steps described above to overwrite some of the operating signals is not performed, but simply the various input signals 402*a* through 404*a* are outputted to the corresponding signal generation sections 502*a* through 504*a*, and similarly the various input signals 402*b* through 404*b* are outputted to the corresponding signal generation sections 502*b* through 504. In concrete terms, the operating lever up/down operating signal 402*a* is outputted to the boom drive signal generation section 502*a*. And the operating lever forward/backward operating signal 403*a* is outputted to the arm drive signal generation section 503*a*. Moreover, the twist grip rotational operation signal 404*a* is outputted to the working tool rotation signal generation section 504*a*.

And the operating lever up/down operating signal 402*b* is outputted to the boom drive signal generation section 502*b*. Moreover, the operating lever forward/backward operating signal 403*b* is outputted to the arm drive signal generation section 503*b*. Furthermore, the twist grip rotational operation signal 404*b* is outputted to the working tool rotation signal generation section 504*b*.

In this manner, with the work machine 200 of this second embodiment, if the operating lever 54*a* and the operating lever 54*b* are operated in approximately the same direction, and moreover the twist grip 55*a* and the twist grip 55*b* are operated in the same direction, then it is inferred that the operator intends dual-arm synchronized operation to be performed, and accordingly dual-arm synchronized operation is enabled. In other words, only if the operator has made an attempt to make both arms be synchronized together, then assistance is provided to dual-arm synchronized operation. At this time, the right and left booms 10*a* and 10*b* and the right and left arms 12*a* and 12*b* are pivoted simultaneously according to the operating amounts of that operating lever, among the right and left operating levers 54*a* and 54*b*, whose operating amounts in the up/down direction and in the forward/backward direction are the greater. And the working tools 14*a* and 14*b* are pivoted simultaneously corresponding to the amount of rotation of that twist grip, among the right and left twist grips 55*a* and 55*b*, whose amount of rotation is the greater. Furthermore, in circumstances other than the above, it is possible to perform operation as in the prior art by using the operating levers 54*a* and 54*b* and the working tool twist grips 55*a* and 55*b* corresponding to each of the two arms.

Moreover, with the work machine 200 of this second embodiment, in addition to the operations and advantageous effects provided by the work machine 200 of the first embodiment, the following operations and advantageous effects are also obtained.

(1) It is arranged for dual-arm synchronized operation to become possible when the operating lever 54*a* and the operating lever 54*b* are both operated in the same direction, or when the twist grip 55*a* and the twist grip 55*b* are both operated in the same direction. Due to this, the workability is enhanced, since explicit changing over operation becomes unnecessary.

(2) Since, of the operating amounts and the rotation amounts on the left and the right, the operating amounts and rotation amounts that are the greater are those that become effective during dual-arm synchronized operation, and are those that are reflected in the amount of shifting of both arms, accordingly operation becomes easier if the operator considers that he desires to control the amounts of shifting of both arms during synchronized operation using the amount by which he moves only one of his arms, so that the working efficiency is enhanced.

Embodiment #3

A third embodiment of the dual-arm work machine according to the present invention will now be explained with reference to FIG. 14. In the following explanation, structural elements that are the same as in the first or the second embodiment will be denoted by the same reference symbols, and the explanation will principally focus upon the features of difference. Points that are not particularly explained are the same as in the first or the second embodiment. In this embodiment, the principal aspect of difference from the second embodiment is that, when dual-arm synchronized operation has become possible, the right and left booms 10*a* and 10*b*, arms 12*a* and 12*b*, and working tools 14*a* and 14*b* are pivoted simultaneously on the basis of the average values of the displacement amounts (i.e. the amounts of operation) of the right side operating lever 54*a* and the left side operating lever 54*b*, and the average value of the displacement amounts (i.e. the amounts of rotational operation) of the right side twist grip 55*a* and the left side twist grip 55*b*.

The operating apparatus of this third embodiment is the same as the operating apparatus of the second embodiment. Moreover, with this second embodiment, in a similar manner to the case with the second embodiment, dual-arm synchronized operation becomes possible when all of the conditions (2-1) through (2-3) are satisfied. And, when all of the conditions (2-1) through (2-3) are satisfied and dual-arm synchronized operation becomes possible, the right and left booms 10a and 10b, arms 12a and 12b, and working tools 14a and 14b are pivoted simultaneously according to the average values of the amounts of displacement (i.e. amounts of operation) of the right side operating lever 54a and the left side operating lever 54b, and according to the average value of the amounts of displacement (i.e. amounts of rotational operation) of the right side twist grip 55a and the left side twist grip 55b.

In concrete terms, the right and left booms 10a and 10b are simultaneously pivoted according to the average value of the operating amounts in the up/down direction of the right side operating lever 54a and the left side operating lever 54b. And the right and left arms 12a and 12b are simultaneously pivoted according to the average value of the operating amounts in the forward/backward direction of the right side operating lever 54a and the left side operating lever 54b. Moreover, as described above, the right and left working tools 14a and 14b are simultaneously pivoted according to the average value of the amounts of rotational operation of the right side twist grip 55a and the left side twist grip 55b.

—Processing by the Operating Signal Equating Calculation Section 811—

Figure 14:
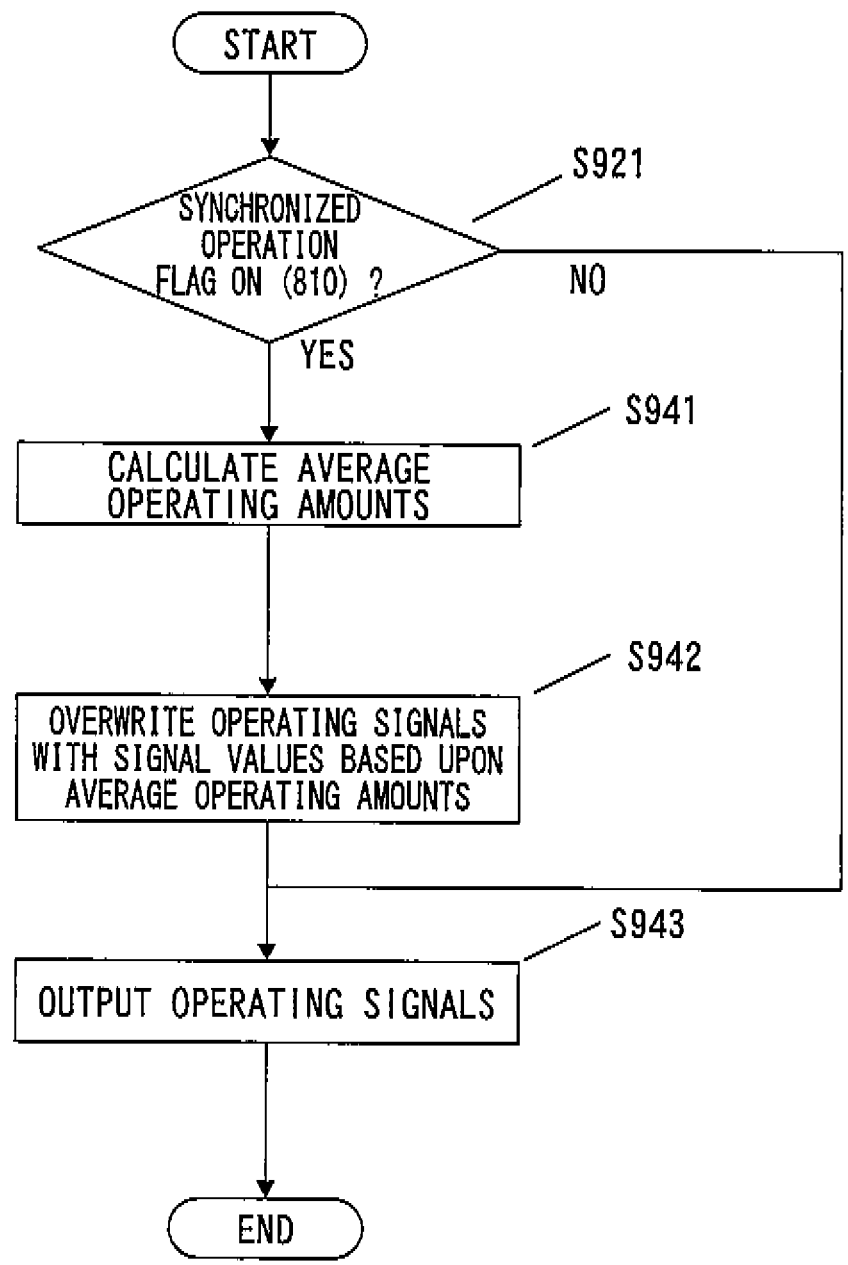
FIG. 14 is a flow chart showing the flow of processing of an operating signal equating calculation section of a third embodiment.

FIG. 14 is a flow chart showing the flow of processing by the operating signal equating calculation section 811 in this third embodiment. When the ignition switch not shown in the figures of the working machine 200 is turned to ON, a program that performs the processing shown in FIG. 14 is started, and is repeatedly executed by the operating signal equating calculation section 811. The step S921 is the same as the step S921 in FIG. 13 for the third embodiment. After the step S921 has been executed, the flow of control is transferred to a step S941.

In the step S941, the average values of the operating amounts of the right side operating lever 54a and of the left side operating lever 54b, and the average value of the amounts of rotational operation of the right side twist grip 55a and of the left side twist grip 55b are calculated (in the following, these average values will simply be termed the "average operating amounts"). In concrete terms, the average of the operating amounts of the right side operating lever 54a and of the left side operating lever 54b in the up/down direction, the average of the operating amounts of the right side operating lever 54a and of the left side operating lever 54b in the forward/backward direction, and the average of the operating amounts of the right side twist grip 55a and of the left side twist grip 55b are calculated.

When the step S941 has been performed the flow of control proceeds to a step S942, in which processing is performed to calculate the values of operating signals corresponding to the average operating amounts calculated in the step S941, and to overwrite these over the corresponding input signals 402a through 404a and input signals 402b through 404b. In concrete terms, processing is performed to replace the values of the input signals 402a through 404a and the values of the input signals 402b through 404b, irrespective of their values, with the values of operating signals that respectively correspond to the averages of their respective operating amounts (i.e., processing to make them be the same). As a result, irrespective of the values of the operating lever up/down operating signals 402a and 402b, they are replaced by values of operating signals that correspond to the average of the operating amounts of the operating levers 54a and 54b in the up/down direction. And, irrespective of the values of the operating lever forward/backward operating signals 403a and 403b, they are replaced by values of operating signals that correspond to the average of the operating amounts of the operating levers 54a and 54b in the forward/backward direction. Moreover, irrespective of the values of the twist grip rotational operation signals 404a and 403b, they are replaced by values of operating signals that correspond to the average of the operating amounts of the twist grips 55a and 55b.

When the step S942 has been executed the flow of control proceeds to a step S943, and the operating signals after the processing of the step S942 described above are outputted to the signal generation sections 502a through 504a and to the signal generation sections 502b through 504b. In other words, an operating signal corresponding to the average of the operating amounts in the up/down direction of the operating levers 54a and 54b is outputted to the boom drive signal generation sections 502a and 502b. And an operating signal corresponding to the average of the operating amounts in the forward/backward direction of the operating levers 54a and 54b is outputted to the arm drive signal generation sections 503a and 503b. Moreover, an operating signal corresponding to the average of the operating amounts of the twist grips 55a and 55b is outputted to the working tool rotation signal generation sections 504a and 504b. When the step S943 has been executed, this program terminates.

But if in the step S921 it is decided that the synchronized operation flag, this being the result of processing by the operating direction determination section 810, is set to OFF, then the flow of control is transferred to the step S943. In this case, processing such as that performed by the step S942 described above to overwrite the operating signals is not performed, but simply the various input signals 402a through 404a are outputted to the corresponding signal generation sections 502a through 504a, and similarly the various input signals 402b through 404b are outputted to the corresponding signal generation sections 502b through 504. In concrete terms, the operating lever up/down operating signal 402a is outputted to the boom drive signal generation section 502a. And the operating lever forward/backward operating signal 403a is outputted to the arm drive signal generation section 503a. Moreover, the twist grip rotational operation signal 404a is outputted to the working tool rotation signal generation section 504a.

And the operating lever up/down operating signal 402b is outputted to the boom drive signal generation section 502b. Moreover, the operating lever forward/backward operating signal 403b is outputted to the arm drive signal generation section 503b. Furthermore, the twist grip rotational operation signal 404b is outputted to the working tool rotation signal generation section 504b.

In this manner, with the work machine 200 of this third embodiment, dual-arm synchronized operation becomes possible when the operating lever 54a and the operating lever 54b are operated in approximately the same direction and moreover the twist grip 55a and the twist grip 55b are operated in the same direction. In other words, the assistance of dual-arm synchronized operation is provided only when the operator makes an attempt to synchronize both arms together. At this time, the right and left booms 10a and 10b, arms 12a and 12b, and working tools 14a and 14b are pivoted simultaneously, in correspondence to the average operating amounts of the right and left operating levers 54a and 54b and of the right and left twist grips 55a and 55b.

Moreover, in any other circumstances, operation according to the prior art becomes possible by operating using the operating levers 54a and 54b and the working tool twist grips 55a and 55b corresponding to each of the two arms.

With this work machine 200 according to the third embodiment described above, in addition to the operations and advantageous effects obtained with the work machines 200 of the first and second embodiments, the following additional operation and advantageous effect is obtained. That is, since the right and left booms 10a and 10b, arms 12a and 12b, and working tools 14a and 14b are pivoted simultaneously in correspondence to the averages of the operating amounts of the right and left operating levers 54a and 54b and the average of the operating amounts of the right and left twist grips 55a and 55b, accordingly, when during synchronized operation the operator considers that he desires to control the shift amounts of the two arms using the amounts by which he moves both his arms, the operation becomes easier, so that the working efficiency is enhanced.

Embodiment #4

A fourth embodiment of the dual-arm work machine according to the present invention will now be explained with reference to FIGS. 15 and 16. In the following explanation, structural elements that are the same as in the first through the third embodiments will be denoted by the same reference symbols, and the explanation will principally focus upon the features of difference. Points that are not particularly explained are the same as in the third embodiment. In this fourth embodiment, the principal aspect of difference from the third embodiment is that a decision is made as to whether or not to make dual-arm synchronized operation possible, on the basis of the operating directions and the operating amounts (in other words, the operating vectors) of the operating levers 54a and 54b and of the twist grips 55a and 55b.

The operating apparatus of the fourth embodiment is the same as the operating apparatus of the second and third embodiments.

—Regarding Dual-Arm Synchronized Operation—

In this fourth embodiment, if all of the following conditions (4-1) through (4-3) are satisfied, then it is considered that the operating amounts and the operating directions of the right side operating lever 54a and twist grip 55a, and of the left side operating lever 54b and twist grip 55b, are approximately the same, and dual-arm synchronized operation is made possible.

(4-1) Either the difference between the operating directions and the operating amounts in the up/down direction (hereinafter termed the "operating vectors") of the right side operating lever 54a and of the left side operating lever 54b is within a predetermined threshold value, or neither the right side operating lever 54a nor the left side operating lever 54b is being operated in the up/down direction.

(4-2) Either the difference between the operating vectors in the forward/backward direction of the right side operating lever 54a and of the left side operating lever 54b is within a predetermined threshold value, or neither the right side operating lever 54a nor the left side operating lever 54b is being operated in the forward/backward direction.

(4-3) Either the difference between the operating directions (i.e. the directions of rotational operation) and the amounts of rotational operation (for convenience, hereinafter termed the "operating vectors") of the right side twist grip 55a and of the left side twist grip 55b is within a predetermined threshold value, or neither the right side twist grip 55a nor the left side twist grip 55b is being rotated.

When all of the conditions (4-1) through (4-3) described above are satisfied so that dual-arm synchronized operation becomes possible, then, in a similar manner to the case with the third embodiment, the right and left booms 10a and 10b, the right and left arms 12a and 12b, and the right and left working tools 14a and 14b are pivoted simultaneously according to the average values of the displacement amounts (i.e. the operating amounts) of the right side operating lever 54a and the left side operating lever 54b, and according to the average value of the displacement amounts (i.e. the amounts of rotational operation) of the right side twist grip 55a and the left side twist grip 55b.

Figure 15:
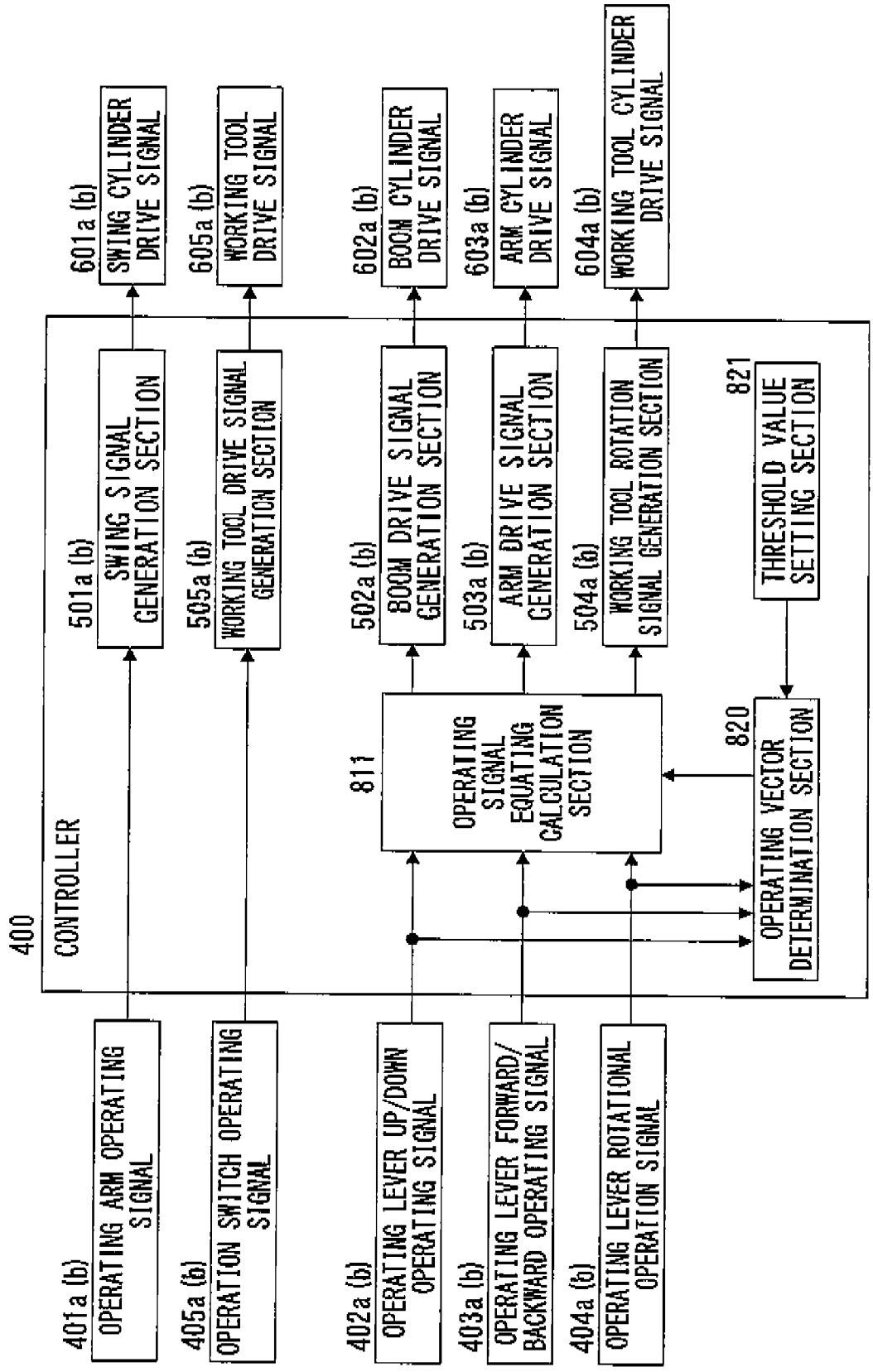
FIG. 15 is a schematic figure related to an operation control system of a fourth embodiment.

FIG. 15 is a schematic figure relating to the operation control system of the fourth embodiment. Instead of the operation direction determination section 810 of the third embodiment, an operating vector determination section 820 and a threshold value setting section 821 are provided to a controller 400. The input signals 402a(b) through 404a(b) from the operating levers and so on are inputted to the operating vector determination section 820. The processing performed by the operating vector determination section 820 will be described hereinafter. Moreover, the threshold value setting section 821 is a setting unit for setting threshold values for deciding whether or not the operating vectors of the right side operating lever 54a and the twist grip 55a, and of the left side operating lever 54b and the twist grip 55b, are approximately the same; and the threshold values that are stored therein may, for example, be set in advance in the factory before shipment of the work machine 200. It should be understood that the threshold values may be set as desired: they may also be set using an external setting device, such as for example a personal computer or the like.

The threshold values that are stored in the threshold value setting section 821 may, for example, include a threshold value related to the difference between the operating vectors in the up/down direction of the operating lever 54a and of the operating lever 54b, a threshold value related to the difference between the operating vectors in the forward/backward direction of the operating lever 54a and of the operating lever 54b, and a threshold value related to the difference between the operating vectors of the twist grip 55a and of the twist grip 55b.

—Processing Performed by the Operating Vector Determination Section 820—

Figure 16:
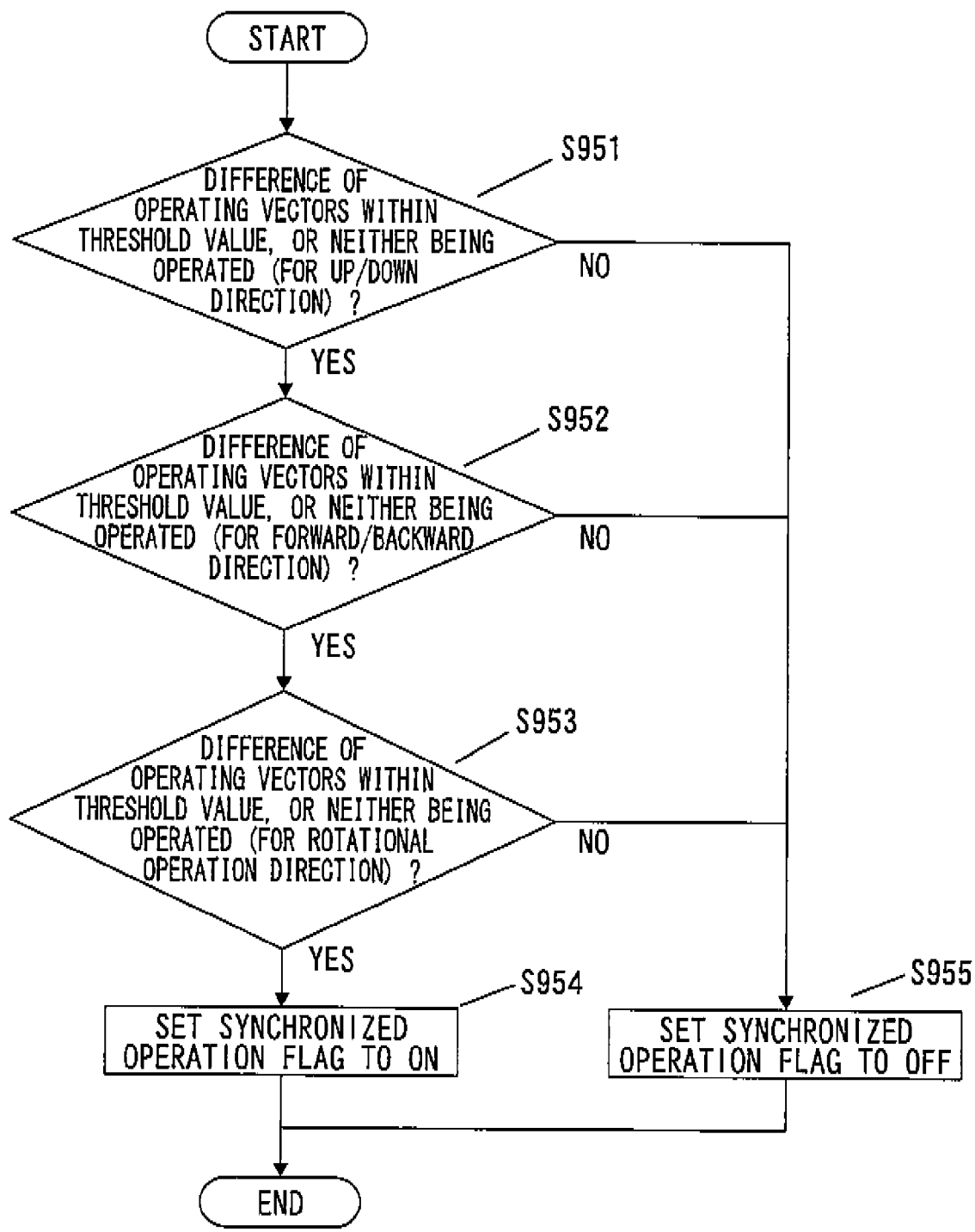
FIG. 16 is a flow chart showing the flow of processing of an operating vector determination section of the fourth embodiment.

FIG. 16 is a flow chart for the flow of processing by the operating vector determination section 820. When an ignition switch not shown in the figures of the work machine 200 is turned to ON, a program that performs the processing shown in FIG. 16 is started, and is repeatedly executed by the operating vector determination section 820. It should be understood that this program is a program for making a decision as to whether or not all of the conditions (4-1) through (4-3) described above are satisfied.

In a first step S951, on the basis of the operating lever up/down operating signal 402a and the operating lever up/down operating signal 402b, a decision is made as to whether or not the condition (4-1) described above is satisfied. If it is decided that the condition (4-1) described above is satisfied, in other words that the difference between the operating vectors in the up/down direction of the right side operating lever 54a and of the left side operating lever 54b is within the predetermined threshold value, or that neither the right side operating lever 54a nor the left side operating lever 54b is being operated in the up/down direction, then the flow of control proceeds to a step S952.

In the step S952, on the basis of the operating lever forward/backward operating signal 403a and the operating lever forward/backward operating signal 403*b*, a decision is made as to whether or not the condition (4-2) described above is satisfied. If it is decided that the condition (4-2) described above is satisfied, in other words that the difference between the operating vectors in the forward/backward direction of the right side operating lever 54*a* and of the left side operating lever 54*b* is within the predetermined threshold value, or that neither the right side operating lever 54*a* nor the left side operating lever 54*b* is being operated in the forward/backward direction, then the flow of control proceeds to the step S953.

In the step S953, on the basis of the twist grip rotational operation signal 404*a* and the twist grip rotational operation signal 404*b*, a decision is made as to whether or not the condition (4-3) described above is satisfied. If it is decided that the condition (4-3) described above is satisfied, in other words that the difference between the operating vectors of the right side twist grip 55*a* and the left side twist grip 55*b* is within the predetermined threshold value, or that neither the right side twist grip 55*a* nor the left side twist grip 55*b* is being rotationally operated, then the flow of control proceeds to the step S954.

In the step S954, it is considered that the operating vectors of the operating levers 54*a* and 54*b*, and the operating vectors of the twist grips 55*a* and 55*b*, are approximately equal on right and left, and that accordingly synchronized operation is to be performed, so that processing is performed to set the synchronized operation flag to ON. When this step S954 has been executed, this program terminates.

If a negative decision is reached in the step S951, a negative decision is reached in the step S952, or a negative decision is reached in the step S953, then the flow of control is transferred to the step S955. In this step S955, when either the operating vectors of the operating levers 54*a* and 54*b* or the operating vectors of the twist grips 55*a* and 55*b* or both are in operation, and the difference of those operating vectors between right and left is greater than the predetermined threshold value, it is considered that synchronized operation is not to be performed, and accordingly processing is performed to set the synchronized operation flag is set to OFF. When this step S955 has been executed, this program terminates.

In this manner, with the work machine of the fourth embodiment, if the operating vectors of the operating lever 54*a* and of the operating lever 54*b* become approximately equal, and moreover the operating vectors of the twist grip 55*a* and of the twist grip 55*b* become approximately equal, then dual-arm synchronized operation becomes possible. In other words, the assistance of dual-arm synchronized operation is provided only if the operator has attempted to synchronize the two arms together. At this time, the right and left booms 10*a* and 10*b*, arms 12*a* and 12*b*, and working tools 14*a* and 14*b* are pivoted simultaneously, corresponding to the averages of the operating amounts of the right and left operating levers 54*a* and 54*b* and the average of the operating amount of the right and left twist grips 55*a* and 55*b*. Moreover, in any other case, operation according to the prior art becomes possible, in which operation is performed using the operating levers 54*a* and 54*b* and the working tool twist grips 55*a* and 55*b* that correspond to each of the two arms respectively.

With this work machine 200 according to the fourth embodiment described above, in addition to the operations and advantageous effects obtained with the work machines 200 of the first through third embodiments, the following additional operation and advantageous effect is obtained. That is, dual-arm synchronized operation becomes possible if operation is performed so that the operating vectors of the operating lever 54*a* and the operating lever 54*b* become approximately equal, or the operating vectors of the twist grip 55*a* and the twist grip 55*b* become approximately equal. Accordingly, since the accuracy with which it is determined whether or not the operator is trying to perform dual-arm synchronized operation is enhanced, and since it is possible for him to perform dual-arm synchronized operation in a more appropriate manner even without performing explicit operation to change over the operational mode, accordingly the working efficiency is enhanced.

Embodiment #5

A fifth embodiment of the dual-arm work machine according to the present invention will now be explained with reference to FIGS. 17 through 20. In the following explanation, structural elements that are the same as in the first through the fourth embodiments will be denoted by the same reference symbols, and the explanation will principally focus upon the features of difference. Points that are not particularly explained are the same as in the second embodiment. In this fifth embodiment, the principal aspect of difference from the second embodiment is that it is arranged for dual-arm synchronized operation to become possible only if the initial attitude of the first front working machine A and the initial attitude of the second front working machine B are approximately the same.

The operating apparatus of the fifth embodiment is the same as the operating apparatus of the second through the fourth embodiments.

Figure 17:
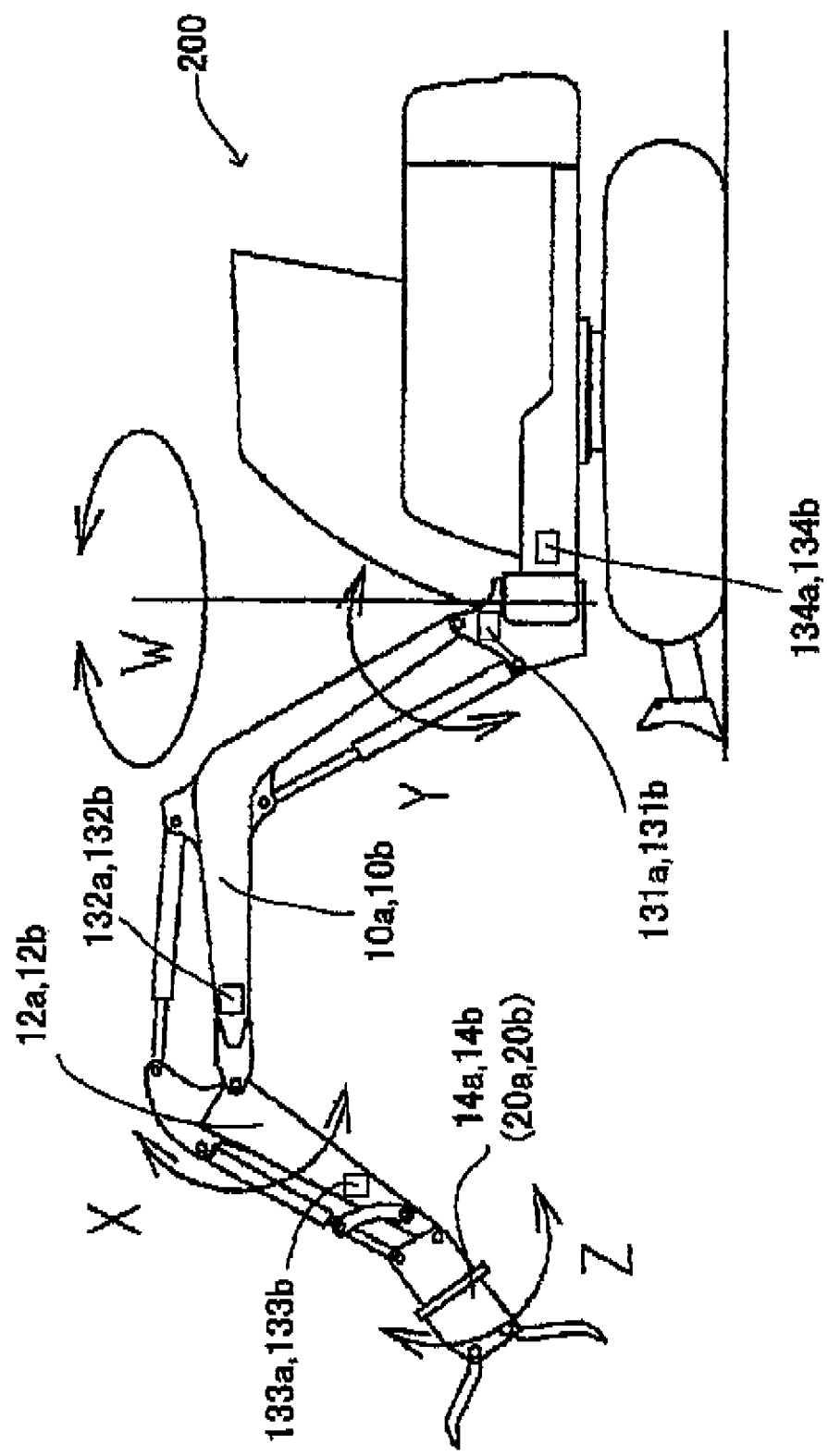
FIG. 17 is a figure showing the way in which angle sensors are arranged.

As shown in FIG. 17, angle sensors 131*a* through 134*a* and 131*b* through 134*b* are provided to the work machine 200 of this fifth embodiment. The angle sensor 131*a* detects the pivoting angle of the boom 10*a* with respect to the swing post 7*a* (refer to the arrow sign Y in FIG. 17; hereinafter simply termed the "boom angle a"). The angle sensor 132*a* detects the pivoting angle of the arm 12*a* with respect to the boom 10*a* (refer to the arrow sign X in FIG. 17; hereinafter simply termed the "arm angle a"). The angle sensor 133*a* detects the pivoting angle of the first working tool 14*a* with respect to the arm 12*a* (refer to the arrow sign Z in FIG. 17; hereinafter simply termed the "working tool angle a"). And the angle sensor 134*a* detects the swing angle of the swing post 7*a* with respect to the revolving upperstructure 3 (refer to the arrow sign W in FIG. 17; hereinafter simply termed the "swing angle a").

And the angle sensor 131*b* detects the pivoting angle of the boom 10*b* with respect to the swing post 7*b* (refer to the arrow sign Y in FIG. 17; hereinafter simply termed the "boom angle b"). The angle sensor 132*b* detects the pivoting angle of the arm 12*b* with respect to the boom 10*b* (refer to the arrow sign X in FIG. 17; hereinafter simply termed the "arm angle b"). The angle sensor 133*b* detects the pivoting angle of the second working tool 14*b* with respect to the arm 12*b* (refer to the arrow sign Z in FIG. 17; hereinafter simply termed the "working tool angle b"). And the angle sensor 134*b* detects the swing angle of the swing post 7*b* with respect to the revolving upperstructure 3 (refer to the arrow sign W in FIG. 17; hereinafter simply termed the "swing angle b").

Figure 18:
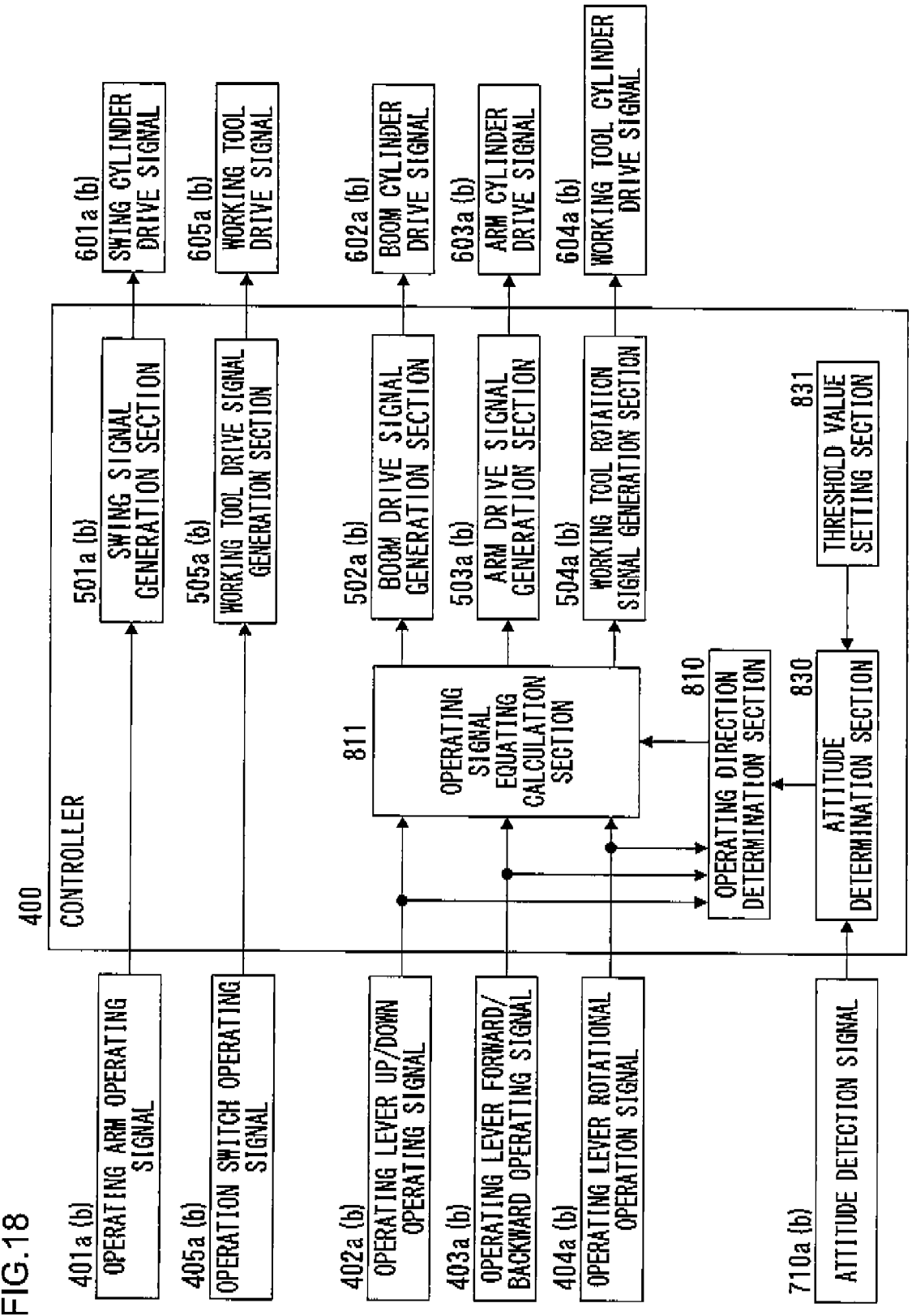
FIG. 18 is a schematic figure related to an operation control system of a fifth embodiment.

FIG. 18 is a schematic figure related to the operation control system of this fifth embodiment. An attitude determination section 830 and a threshold value setting section 831 are provided to a controller 400. Attitude detection signals 710*a* and 710*b* are read into the attitude determination section 830. The term "attitude detection signals 710*a*" is a generic term for the angle detection signals outputted from the angle sensors 131*a* through 134*a*. It should be understood that a boom angle detection signal that is outputted from the angle sensor 131a, an arm angle detection signal that is outputted from the angle sensor 132a, a working tool angle detection signal that is outputted from the angle sensor 133a, and a swing angle detection signal that is outputted from the angle sensor 134a are included in the attitude detection signals 710a. In a similar manner, the term "attitude detection signals 710b" is a generic term for the angle detection signals outputted from the angle sensors 131b through 133b. A boom angle detection signal that is outputted from the angle sensor 131b, an arm angle detection signal that is outputted from the angle sensor 132b, a working tool angle detection signal that is outputted from the angle sensor 133b, and a swing angle detection signal that is outputted from the angle sensor 134b are included in the attitude detection signals 710b. The processing performed by the attitude determination section 830 will be described hereinafter.

The threshold value setting section 831 is a setting unit for setting threshold values for deciding whether or not the initial attitude of the first front working machine A and the initial attitude of the second front working machine B are approximately the same, and the threshold values that are stored therein may, for example, be set in advance in the factory before shipment of the work machine 200. It should be understood that the threshold values may be set as desired: they may also be set using an external setting device, such as for example a personal computer or the like. The threshold values that are stored in the threshold value setting section 831 may, for example, include a threshold value related to the difference between the boom angle a and the boom angle b, a threshold value related to the difference between the arm angle a and the arm angle b, a threshold value related to the difference between the working tool angle a and the working tool angle b, a threshold value related to the difference (i.e. the deviation) between the fore and aft direction of the work machine 200 (i.e. its center line 3c in FIG. 2) and the swing angle a, and a threshold value related to the difference (i.e. the deviation) between the fore and aft direction of the work machine 200 (i.e. its center line 3c in FIG. 2) and the swing angle b.

On the basis of the attitude detection signals 710a and 710b, a decision is made by the attitude determination section 830 as to whether or not the initial attitude of the first front working machine A and the initial attitude of the second front working machine B are approximately the same. In concrete terms, it is decided that the initial attitude of the first front working machine A and the initial attitude of the second front working machine B are approximately the same, if all of the following conditions (5-1) through (5-5) are satisfied.

(5-1) The difference between the boom angle a and the boom angle b is within a predetermined threshold value.

(5-2) The difference between the arm angle a and the arm angle b is within a predetermined threshold value.

(5-3) The difference between the working tool angle a and the working tool angle b is within a predetermined threshold value.

(5-4) The deviation between the fore and at direction of the work machine 200 and the swing angle a is within a predetermined threshold value.

(5-5) The deviation between the fore and aft direction of the work machine 200 and the swing angle b is within a predetermined threshold value.

—Processing by the Operating Direction Determination Section 810—

Figure 19:
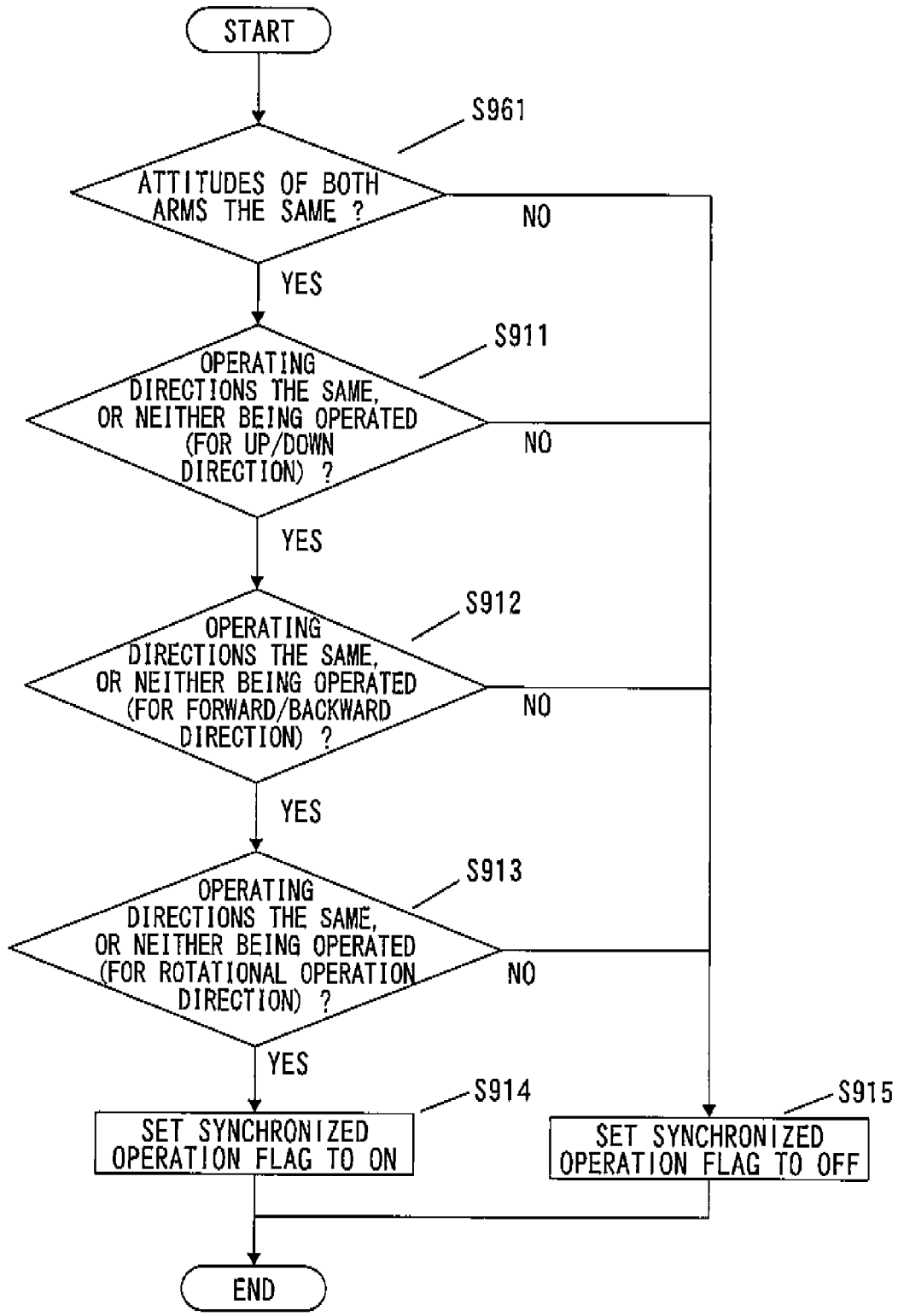
FIG. 19 is a flow chart showing the flow of processing of an operating direction determination section of the fifth embodiment.

FIG. 19 is a flow chart showing the flow of processing by the operating direction determination section 810. When the ignition switch not shown in the figures of the working machine 200 is turned to ON, a program that performs the processing shown in FIG. 19 is started, and is repeatedly executed by the operating direction determination section 810.

In a first step S961, it is decided by the attitude determination section 830 whether or not the initial attitude of the first front working machine A and the initial attitude of the second front working machine B are approximately the same. In other words, it is decided whether or not it has been determined by the attitude determination section 830 that all of the conditions (5-1) through (5-5) described above are satisfied. If an affirmative decision is reached in this step S961 then the flow of control is transferred to a step S911, whereas if a negative decision is reached in the step S961 then the flow of control is transferred to a step S915. Since the subsequent steps S911 through S915 are the same as those in the flow of processing by the operating direction determination section 810 of the second embodiment shown in FIG. 12, accordingly explanation thereof will be omitted.

In this manner, with the work machine 200 of this fifth embodiment, dual-arm synchronized operation becomes possible only if the initial attitude of the first front working machine A and the initial attitude of the second front working machine B are approximately the same.

Figure 20:
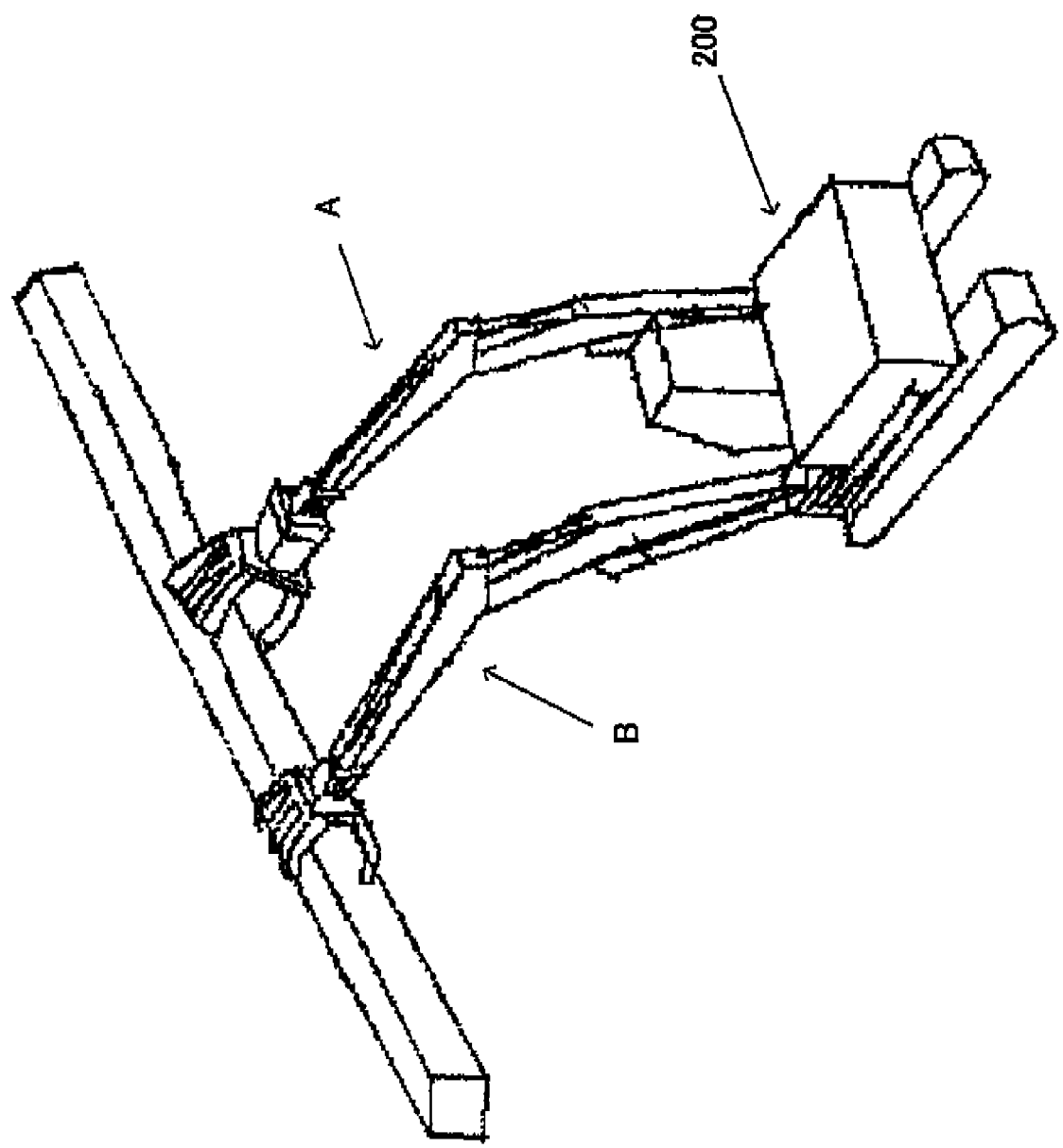
FIG. 20 is a figure for explanation of a situation in which a task such as carrying a work object in a parallel manner is being performed by a work machine.

With this work machine 200 according to the fifth embodiment described above, in addition to the operations and advantageous effects obtained with the work machines 200 of the first through the fourth embodiments, the following additional operation and advantageous effect is obtained. That is, since dual-arm synchronized operation only becomes possible if the initial attitude of the first front working machine A and the initial attitude of the second front working machine B are approximately the same, accordingly it is possible to prevent unintended and unnecessary dual-arm synchronized operation. Accordingly, as shown in FIG. 20, it is possible to provide a work machine that is appropriate to a task such as carrying a work object in a parallel manner.

Embodiment #6

A sixth embodiment of the dual-arm work machine according to the present invention will now be explained with reference to FIGS. 21 through 23. In the following explanation, structural elements that are the same as in the first through the fifth embodiments will be denoted by the same reference symbols, and the explanation will principally focus upon the features of difference. Points that are not particularly explained are the same as in the second embodiment. In this sixth embodiment, the principal aspect of difference from the second embodiment is that, even if the operating lever 54a and the operating lever 54b are operated in approximately the same direction, and also the twist grip 55a and the twist grip 55b are operated in the same direction, the assistance of dual-arm synchronized operation is provided only if a switch that permits assistance by dual-arm synchronized operation is operated by the operator.

—The Operating Apparatus—

Figure 21:
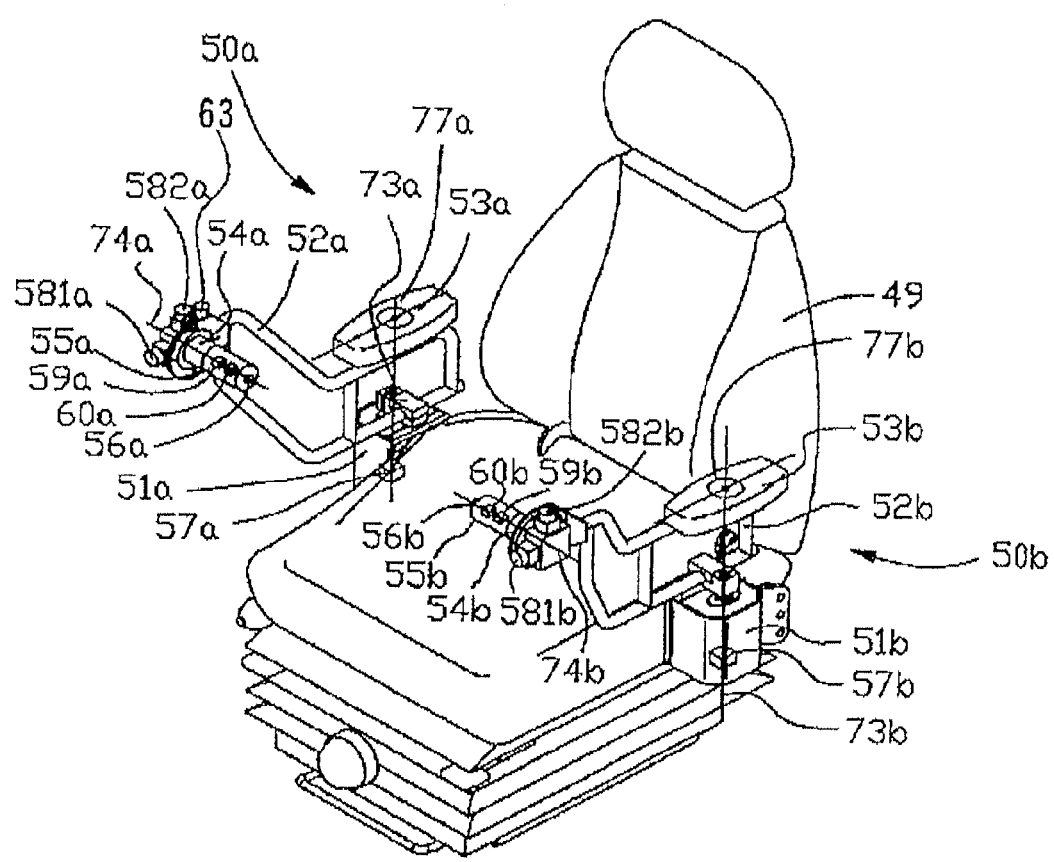
FIG. 21 is a figure showing an operating device of a sixth embodiment.

FIG. 21 is a figure showing the operating apparatus of the sixth embodiment. With the operating devices 50a and 50b of the sixth embodiment, a dual-arm synchronized operation assistance permission switch 63 is provided, for example near the end of the operating arm 52a. This dual-arm synchronized operation assistance permission switch 63 is a switch that is operated by the operator in order to select whether or not to make dual-arm synchronized operation possible (i.e. whether or not to permit assistance by dual-arm synchronized operation), if all of the conditions (2-1) through (2-3) for making dual-arm synchronized operation possible in the second embodiment described above are satisfied. When this dual-arm synchronized operation assistance permission switch 63 is operated by the operator so as to permit assistance by dual-arm synchronized operation, it outputs a synchronized operation assistance permission signal 720 to an operating direction determination section 840 that will be described hereinafter.

—Dual-Arm Synchronized Operation—

In other words, with this sixth embodiment, dual-arm synchronized operation becomes possible when both of the following conditions (6-1) and (6-2) are satisfied.

(6-1) The dual-arm synchronized operation assistance permission switch 63 is operated by the operator so as to permit assistance by dual-arm synchronized operation.

(6-2) All of the conditions (2-1) through (2-3) in the second embodiment described above for making dual-arm synchronized operation possible are satisfied.

When both the conditions (6-1) and (6-2) described above are satisfied and dual-arm synchronized operation becomes possible, in a similar manner to the second embodiment described above, the right and left booms 10a and 10b and the right and left arms 12a and 12b are simultaneously pivoted according to the operating amounts of that operating lever, among the right side operating lever 54a and the left side operating lever 54b, whose amount of displacement (i.e. whose amount of operation) is the greater.

Figure 22:
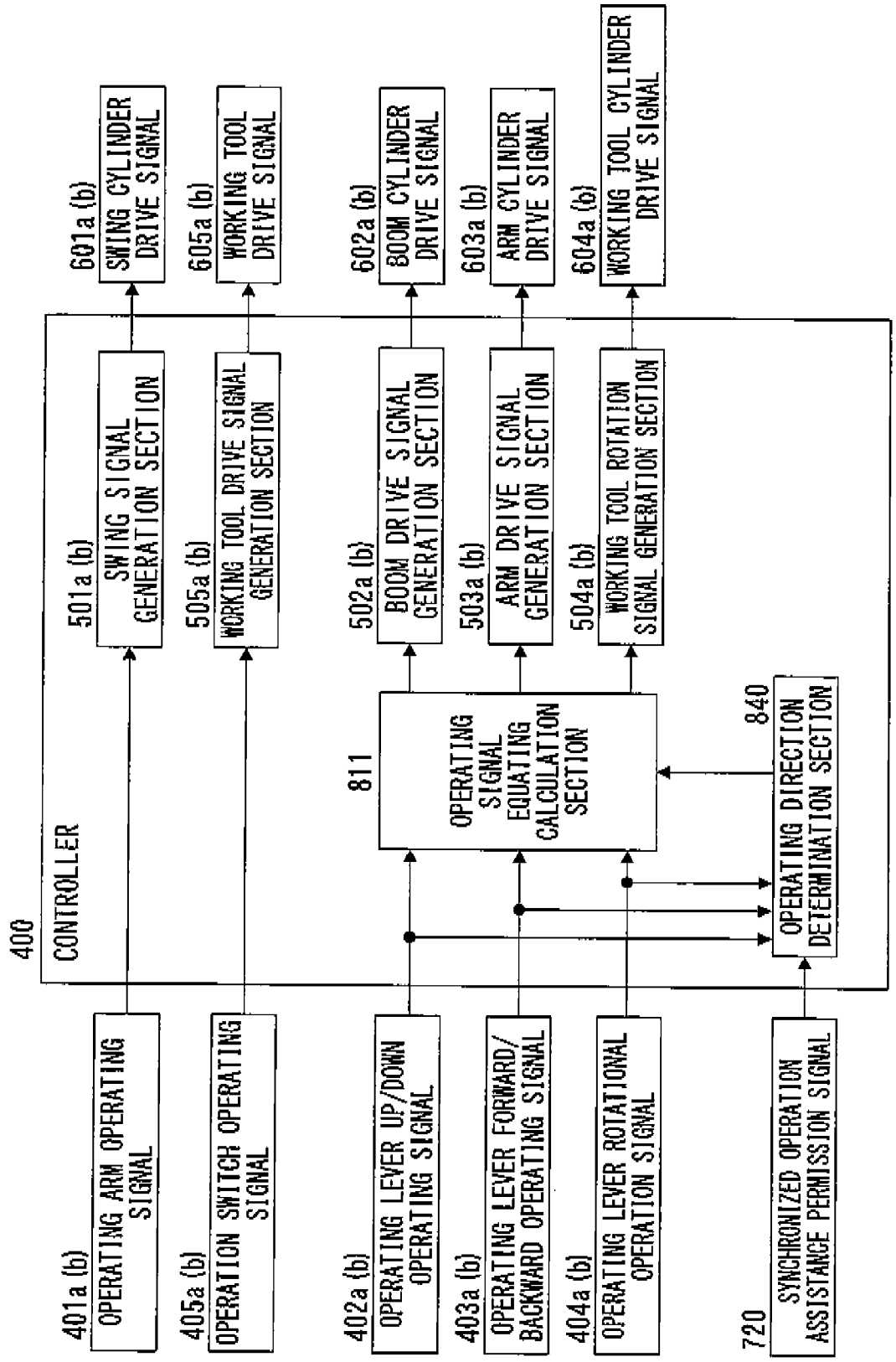
FIG. 22 is a schematic figure related to an operation control system of the sixth embodiment.

FIG. 22 is a schematic figure related to the operation control system of this sixth embodiment. An operating direction determination section 840 is provided to a controller 400, instead of the operating direction determination section 810 of the second embodiment. The input signals 402a(b) from the operating levers and so on, and the synchronized operation assistance permission signal 720 from the dual-arm synchronized operation assistance permission switch 63, are inputted to the operating direction determination section 810.

—Processing by the Operating Direction Determination Section 840—

FIG. 23 is a flow chart showing the flow of processing by the operating direction determination section 840. When the ignition switch not shown in the figures of the working machine 200 is turned to ON, a program that performs the processing shown in FIG. 23 is started, and is repeatedly executed by the operating direction determination section 840. It should be understood that this program is a program for determining whether or not both of the conditions (6-1) and (6-2) described above are satisfied.

In a first step S971, a decision is made as to whether or not the synchronized operation assistance permission signal 720 outputted from the dual-arm synchronized operation assistance permission switch 63 is being received. In other words, a decision is made as to whether or not the condition (6-1) described above is satisfied. If an affirmative decision is reached in the step S97 then the flow of control is transferred to a step S911, whereas if a negative decision is reached in the step S971 the flow of control is transferred to a step S915. Since the subsequent steps from the step S911 through the step S915 are a flow of processing for deciding whether or not the condition (6-2) described above is satisfied, and are the same as the processing flow of the operating direction determination section 810 in the second embodiment as shown in FIG. 12, accordingly explanation thereof will be omitted.

In this manner, with the work machine 200 of this sixth embodiment, dual-arm synchronized operation becomes possible only when the dual-arm synchronized operation assistance permission switch 63 is operated by the operator so as to permit assistance by dual-arm synchronized operation. Here, the operating direction determination section 840 also functions as a shared drive command generation permission section that on the basis of the synchronized operation assistance permission signal 720, either permits or prohibits assistance by dual-arm synchronized operation, in other words either permits or prohibits generation and output of shared drive commands for dual-arm synchronized operation.

With this work machine 200 according to the sixth embodiment described above, in addition to the operations and advantageous effects obtained with the work machines 200 of the first through the fifth embodiments, the following additional operation and advantageous effect is obtained. That is, the function of dual-arm synchronized operation can be temporarily stopped when the assistance of dual-arm synchronized operation is completely unnecessary. Accordingly, it is possible to provide a work machine that can handle a yet wider range of tasks.

—Variant Embodiments—

(1) While in the explanation described above it was arranged, for issuing commands for operation of the booms 10a and 10b, the arms 12a and 12b, and the working tools 14a and 14b, to employ the operating levers 54a and 54b that were mounted horizontally and the working tool twist grips 55a and 55b that were mounted around these operating levers 54a and 54b so as to rotate freely thereupon, this is not to be considered as being limitative of the present invention. Operating devices other than horizontally mounted operating levers or twist grips would also be acceptable, provided that they are ones that can appropriately set the operating speeds of the front working machines A and B. Moreover, the positions in which such operating devices are disposed are not to be considered as being limited to the ones described above.

(2) The relationship in the explanation described above between the operating directions of the operating levers 54a and 54b and the working tool twist grips 55a and 55b, and the drive directions of the various components included in the front working machines A and B, is only one example of such a relationship, and is not to be considered as being limitative of the present invention.

(3) In the first embodiment described above, it was arranged for it to be possible, by operating the operating lever selection switch 61, either for it to be possible to operate both the first front working machine A and the second front working machine B with the right side operating device 50a, or for it to be possible to operate both the first front working machine A and the second front working machine B with the left side operating device 50b; but this is not limitative of the present invention. For example, it would also be acceptable to make a setting in advance within the controller 400 so as to make it possible to operate both the first front working machine A and second front working machine B with either the right side operating device 50a or the left side operating device 50b.

(4) While, in the explanation described above, it was arranged to perform processing to make three pairs of operating signals the same as one another, i.e. the operating lever up/down operating signals 402a(b), the operating lever forward/backward operating signals 403a(b), and the twist grip rotational operation signals 404a(b), this is not to be considered as being limitative of the present invention. Of the above described three pairs of operating signals, it would also be acceptable to arrange to make at least one pair the same as one another. Moreover, in addition to the processing for making these operating signals the same as one another, or separately therefrom, it would also be acceptable to arrange to perform processing for making the operation switch operating signals 405a(b) the same as one another as well.

(5) During dual-arm synchronized operation, if either one or both of the swing post 7a and the swing post 7b should deviate from the fore and aft direction of the work machine 200 (i.e. should swing in the left to right direction), then there is a fear that the relative position of the right and left working tools 14a and 14b may undesirably change, so that a work object that is being grasped may suffer damage. Accordingly, it would also be acceptable to provide a structure such that, during dual-arm synchronized operation, the swing posts 7a and 7b are not allowed to swing, even though the operating arms 52a and 52b are operated. In concrete terms, it would be possible to provide a structure for the controller 400 such that, during dual-arm synchronized operation, even if the operating arm operating signals 401a and 401b are inputted, the swing cylinder drive signals 601a and 601b are not outputted by the swing signal generation sections 501a and 501b.

(6) While in the fourth embodiment described above it was arranged, during synchronized operation, to control the shift amounts of both arms on the basis of the averages of the operating amounts of the right and left operating levers and so on, as in the third embodiment described above, the present invention is not to be considered as being limited by this feature. For example, in the fourth embodiment, it would be possible to arrange to provide a structure in which the shift amounts of both arms were controlled during synchronized operation on the basis of the operating amount of that one of the operating levers and so on, among the right and left operating levers and so on, whose operating amount is the greater, as in the second embodiment.

Moreover, in a similar manner, in the fifth and the sixth embodiment described above, it would also be acceptable to provide a structure in which, during synchronized operation, the shift amounts of both the arms are controlled on the basis of the averages of the operating amounts of the right and left operating levers and so on, as in the third embodiment described above. Furthermore, in the second and fourth through sixth embodiments described above, it would also be acceptable to provide a structure in which, during synchronized operation, the shift amounts of both the arms are controlled on the basis of the operating amount of that one of the operating levers and so on, among the right and left operating levers and so on, whose operating amount is the smaller.

(7) While, in the explanation given above, it was arranged for both the arms to be synchronized and driven by performing processing with the operating signal equating calculation section 801 to make the input signals 402a(b) through 404a(b) of the operating levers and so on the same, and by these operating signals, after they have thus been equated by the operating signal equating calculation section 801, being outputted to the signal generation sections 502a through 504a and to the signal generation sections 502b through 504b, the present invention is not to be considered as being limited by this feature. For example, it would also be acceptable to arrange to provide a structure in which the input signals 402a(b) through 404a(b) are inputted just as they are to the signal generation sections 502a through 504a and to the signal generation sections 502b through 504b, and processing is performed with the signal generation sections 502a through 504a and the signal generation sections 502b through 504b to make the drive signals 602a(b) through 604a(b) the same as one another. And it would be acceptable to arrange for the two arms to be driven in a synchronized manner by outputting the drive signals 602a(b) through 604a(b), after this processing to make the signals the same has been performed.

(8) The embodiments and variant embodiments described above can also be combined together in various ways. For example, it would be possible to combine the fifth embodiment and the sixth embodiment described above. By doing this, dual-arm synchronized operation would only become possible if the initial attitude of the first front working machine A and the initial attitude of the second front working machine B were approximately the same, and also the dual-arm synchronized operation assistance permission switch 63 were operated by the operator so as to permit assistance by dual-arm synchronized operation. However, if the initial attitude of the first front working machine A and the initial attitude of the second front working machine B were not approximately the same, or if the dual-arm synchronized operation assistance permission switch 63 was not operated by the operator so as to permit the assistance of dual-arm synchronized operation, then it would be possible to prevent dual-arm synchronized operation from being performed.

It should be understood that the present invention is not to be considered as being limited by the embodiments described above; it includes dual-arm work machines of various constructions that are characterized by comprising: a first front working machine to which a first attachment is mounted; a second working machine to which a second attachment is mounted; a first drive device that drives the first front working machine and the first attachment on the basis of a first drive command from a first operation member; a second drive device that drives the second front working machine and the second attachment on the basis of a second drive command from a second operation member; and a drive command output device that inputs the first and second drive commands, and generates and outputs a shared drive command that drives the first and second drive devices.

The present application is based upon Japanese Patent Application 2012 030899 (filed on 15 Feb. 2012), and the contents thereof are hereby incorporated herein by reference.

The invention claimed is:
1. A dual-arm work machine comprising:
a first front working machine to which a first attachment is mounted;
a second front working machine to which a second attachment is mounted;
a first drive device that drives the first front working machine and the first attachment based on a first drive command from a first operation member;
a second drive device that drives the second front working machine and the second attachment based on a second drive command from a second operation member; and
a drive command output device that inputs the first and second drive commands, and generates and outputs a shared drive command that drives the first and second drive devices;

a first operating direction determination section that determines an operating direction of the first operation member;

a second operating direction determination section that determines an operating direction of the second operation member; and a synchronized operation decision section that makes a decision as to whether or not the operating direction of the first operation member determined by the first operating direction determination section and the operating direction of the second operation member determined by the second operating direction determination section are the same, wherein:

if it is decided by the synchronized operation decision section that the operating direction of the first operation member and the operating direction of the second operation member are the same, the drive command output device generates and outputs the shared drive command based on the first drive command from the first operation member or the second drive command from the second operation member.

2. The dual-arm work machine according to claim 1, further comprising:

a synchronization selection member that is operated in order for a user to select whether or not a movement of the first front working machine and the first attachment and a movement of the second front working machine and the second attachment are to be synchronized or not; and a shared drive command generation permission section that permits generation and output of the shared drive command by the drive command output device if synchronization of the movement of the first front working machine and the first attachment and the movement of the second front working machine and the second attachment is selected by the synchronization selection member, and prohibits generation and output of the shared drive command by the drive command output device if synchronization of the movement of the first front working machine and the first attachment and the movement of the second front working machine and the second attachment is not selected by the synchronization selection member.

3. The dual-arm work machine according to claim 1, further comprising:

a first attitude detection unit that detects an attitude of the first front working machine and the first attachment;

a second attitude detection unit that detects an attitude of the second front working machine and the second attachment;

an attitude determination section that determines whether or not the attitude of the first front working machine and the first attachment detected by the first attitude detection unit and the attitude of the second front working machine and the second attachment detected by the second attitude detection unit are approximately the same; and a shared drive command generation permission section that permits generation and output of the shared drive command by the drive command output device when it is decided by the attitude determination section that the attitude of the first front working machine and the first attachment and the attitude of the second front working machine and the second attachment are approximately the same, and prohibits generation and output of the shared drive command by the drive command output device when it is decided by the attitude determination section that the attitude of the first front working machine and the first attachment and the attitude of the second front working machine and the second attachment are not approximately the same.

4. The dual-arm work machine according to claim 3, further comprising:

a synchronization selection member that is operated in order for a user to select whether or not the movement of the first front working machine and the first attachment and the movement of the second front working machine and the second attachment are to be synchronized or not, wherein:

the shared drive command generation permission section permits generation and output of the shared drive command by the drive command output device when it is decided by the attitude determination section that the attitude of the first front working machine and the first attachment and the attitude of the second front working machine and the second attachment are approximately the same, and synchronization of the movement of the first front working machine and the first attachment and the movement of the second front working machine and the second attachment is selected by the synchronization selection member, and prohibits generation and output of the shared drive command by the drive command output device when it is decided by the attitude determination section that the attitude of the first front working machine and the first attachment and the attitude of the second front working machine and the second attachment are not approximately the same, or synchronization of the movement of the first front working machine and the first attachment and the movement of the second front working machine and the second attachment is not selected by the synchronization selection member.

5. A dual-arm work machine comprising:

a first front working machine to which a first attachment is mounted;

a second front working machine to which a second attachment is mounted;

a first drive device that drives the first front working machine and the first attachment based on a first drive command from a first operation member;

a second drive device that drives the second front working machine and the second attachment based on a second drive command from a second operation member; and a drive command output device that inputs the first and second drive commands, and generates and outputs a shared drive command that drives the first and second drive devices;

a first operating direction determination section that determines an operating direction of the first operation member;

a second operating direction determination section that determines an operating direction of the second operation member;

a first operating amount determination section that determines an operating amount of the first operation member;

a second operating amount determination section that determines an operating amount of the second operation member; and a synchronized operation decision section that makes a decision as to whether or not the operating direction of the first operation member determined by the first operating direction determination section and the operating direction of the second operation member determined by the second operating direction determination section are the same, wherein:
  if it is decided by the synchronized operation decision section that the operating direction of the first operation member and the operating direction of the second operation member are the same, the drive command output device generates and outputs the shared drive command based on an average value of the operating amount of the first operation member determined by the first operating amount determination section and the operating amount of the second operation member as determined by the second operating amount determination section.

6. The dual-arm work machine according to claim 5, further comprising:
  a synchronization selection member that is operated in order for a user to select whether or not a movement of the first front working machine and the first attachment and a movement of the second front working machine and the second attachment are to be synchronized or not; and
  a shared drive command generation permission section that permits generation and output of the shared drive command by the drive command output device if synchronization of the movement of the first front working machine and the first attachment and the movement of the second front working machine and the second attachment is selected by the synchronization selection member, and prohibits generation and output of the shared drive command by the drive command output device if synchronization of the movement of the first front working machine and the first attachment and the movement of the second front working machine and the second attachment is not selected by the synchronization selection member.

7. The dual-arm work machine according to claim 5, further comprising:
  a first attitude detection unit that detects an attitude of the first front working machine and the first attachment;
  a second attitude detection unit that detects an attitude of the second front working machine and the second attachment;
  an attitude determination section that determines whether or not the attitude of the first front working machine and the first attachment detected by the first attitude detection unit and the attitude of the second front working machine and the second attachment detected by the second attitude detection unit are approximately the same; and
  a shared drive command generation permission section that permits generation and output of the shared drive command by the drive command output device when it is decided by the attitude determination section that the attitude of the first front working machine and the first attachment and the attitude of the second front working machine and the second attachment are approximately the same, and prohibits generation and output of the shared drive command by the drive command output device when it is decided by the attitude determination section that the attitude of the first front working machine and the first attachment and the attitude of the second front working machine and the second attachment are not approximately the same.

8. The dual-arm work machine according to claim 7, further comprising:
  a synchronization selection member that is operated in order for a user to select whether or not the movement of the first front working machine and the first attachment and the movement of the second front working machine and the second attachment are to be synchronized or not, wherein:
  the shared drive command generation permission section permits generation and output of the shared drive command by the drive command output device when it is decided by the attitude determination section that the attitude of the first front working machine and the first attachment and the attitude of the second front working machine and the second attachment are approximately the same, and synchronization of the movement of the first front working machine and the first attachment and the movement of the second front working machine and the second attachment is selected by the synchronization selection member, and prohibits generation and output of the shared drive command by the drive command output device when it is decided by the attitude determination section that the attitude of the first front working machine and the first attachment and the attitude of the second front working machine and the second attachment are not approximately the same, or synchronization of the movement of the first front working machine and the first attachment and the movement of the second front working machine and the second attachment is not selected by the synchronization selection member.

9. A dual-arm work machine comprising:
  a first front working machine to which a first attachment is mounted;
  a second front working machine to which a second attachment is mounted;
  a first drive device that drives the first front working machine and the first attachment based on a first drive command from a first operation member;
  a second drive device that drives the second front working machine and the second attachment based on a second drive command from a second operation member; and
  a drive command output device that inputs the first and second drive commands, and generates and outputs a shared drive command that drives the first and second drive devices;
  a first operating vector calculation unit that calculates an operating vector of the first operation member;
  a second operating vector calculation unit that calculates an operating vector of the second operation member; and
  a synchronized operation decision section that makes a decision as to whether or not the operating vector of the first operation member calculated by the first operating vector calculation unit and the operating vector of the second operation member calculated by the second operating vector calculation unit are approximately the same, wherein:
  if it is decided by the synchronized operation decision section that the operating vector of the first operation member and the operating vector of the second operation member are approximately the same, the drive command output device generates and outputs the shared drive command based on the first drive command from the first operation member and/or the second drive command from the second operation member.

10. The dual-arm work machine according to claim 9, further comprising:
  a synchronization selection member that is operated in order for a user to select whether or not a movement of the first front working machine and the first attachment and a movement of the second front working machine and the second attachment are to be synchronized or not; and a shared drive command generation permission section that permits generation and output of the shared drive command by the drive command output device if synchronization of the movement of the first front working machine and the first attachment and the movement of the second front working machine and the second attachment is selected by the synchronization selection member, and prohibits generation and output of the shared drive command by the drive command output device if synchronization of the movement of the first front working machine and the first attachment and the movement of the second front working machine and the second attachment is not selected by the synchronization selection member.

11. The dual-arm work machine according to claim 9, further comprising:

a first attitude detection unit that detects an attitude of the first front working machine and the first attachment;

a second attitude detection unit that detects an attitude of the second front working machine and the second attachment;

an attitude determination section that determines whether or not the attitude of the first front working machine and the first attachment detected by the first attitude detection unit and the attitude of the second front working machine and the second attachment detected by the second attitude detection unit are approximately the same; and a shared drive command generation permission section that permits generation and output of the shared drive command by the drive command output device when it is decided by the attitude determination section that the attitude of the first front working machine and the first attachment and the attitude of the second front working machine and the second attachment are approximately the same, and prohibits generation and output of the shared drive command by the drive command output device when it is decided by the attitude determination section that the attitude of the first front working machine and the first attachment and the attitude of the second front working machine and the second attachment are not approximately the same.

12. The dual-arm work machine according to claim 11, further comprising:

a synchronization selection member that is operated in order for a user to select whether or not the movement of the first front working machine and the first attachment and the movement of the second front working machine and the second attachment are to be synchronized or not, wherein:

the shared drive command generation permission section permits generation and output of the shared drive command by the drive command output device when it is decided by the attitude determination section that the attitude of the first front working machine and the first attachment and the attitude of the second front working machine and the second attachment are approximately the same, and synchronization of the movement of the first front working machine and the first attachment and the movement of the second front working machine and the second attachment is selected by the synchronization selection member, and prohibits generation and output of the shared drive command by the drive command output device when it is decided by the attitude determination section that the attitude of the first front working machine and the first attachment and the attitude of the second front working machine and the second attachment are not approximately the same, or synchronization of the movement of the first front working machine and the first attachment and the movement of the second front working machine and the second attachment is not selected by the synchronization selection member.

* * * * *